United States Patent
El-Assaad et al.

(10) Patent No.: US 12,426,626 B2
(45) Date of Patent: Sep. 30, 2025

(54) REFILLING DEVICE, REFILLING APPARATUS AND METHOD

(71) Applicant: Nicoventures Trading Limited, London (GB)

(72) Inventors: Carla El-Assaad, London (GB); Howard Rothwell, London (GB); Richard Haines, London (GB); Jared Aller, London (GB); Yashas Dinesh Shetty, London (GB); Vasanthan Mani, London (GB); Sudarshan Malapanagudi, London (GB); Sudarshan Mahalingam, London (GB); Suresh Kumar Natarajan, London (GB); Abhilash Radhakrishnan, London (GB); Nick Talbot, London (GB); William Duncan Webb, II, London (GB); Jan Schmitt, London (GB); Cale Kaufman, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 18/250,064

(22) PCT Filed: Oct. 22, 2021

(86) PCT No.: PCT/GB2021/052740
§ 371 (c)(1),
(2) Date: Apr. 21, 2023

(87) PCT Pub. No.: WO2022/084690
PCT Pub. Date: Apr. 28, 2022

(65) Prior Publication Data
US 2023/0397658 A1    Dec. 14, 2023

(30) Foreign Application Priority Data

Oct. 22, 2020 (GB) ..................... 2016760
Jun. 18, 2021 (GB) ..................... 2108805

(51) Int. Cl.
*B65B 3/04* (2006.01)
*A24F 15/015* (2020.01)
(Continued)

(52) U.S. Cl.
CPC ............ *A24F 15/015* (2020.01); *A24F 40/10* (2020.01); *A24F 40/42* (2020.01); *A24F 40/485* (2020.01);
(Continued)

(58) Field of Classification Search
CPC .......... A24F 15/015; B65B 3/04; B65B 57/04
See application file for complete search history.

(56) References Cited

U.S. PATENT DOCUMENTS

2010/0288395 A1* 11/2010 Hagen ................. B03C 1/288
141/234
2015/0245654 A1   9/2015 Memari et al.
(Continued)

FOREIGN PATENT DOCUMENTS

EP     3292771 A1    3/2018
WO  2015028815 A1    3/2015
(Continued)

OTHER PUBLICATIONS

"International Search Report and Written Opinion received for PCT Patent Application No. PCT/GB2021/052740, mailed on Feb. 7, 2022", 17 pages.
(Continued)

*Primary Examiner* — Paul J Gray
(74) *Attorney, Agent, or Firm* — Merchant & Gould P.C.

(57) ABSTRACT

A refilling device for an article of an aerosol provision system comprises refilling control circuitry configured to
(Continued)

facilitate the transfer of aerosol-generating material from a reservoir to the article in response to detecting that the article has been received by the refilling device.

19 Claims, 9 Drawing Sheets

(51) Int. Cl.
    *A24F 40/10*     (2020.01)
    *A24F 40/42*     (2020.01)
    *A24F 40/485*     (2020.01)
    *A24F 40/53*     (2020.01)
    *A24F 40/65*     (2020.01)
    *A24F 40/95*     (2020.01)
    *B65B 43/54*     (2006.01)
    *B65B 57/04*     (2006.01)
    *B65B 57/06*     (2006.01)
    *B65B 57/18*     (2006.01)
    *A24F 40/40*     (2020.01)
    *G05B 15/02*     (2006.01)

(52) U.S. Cl.
    CPC .............. *A24F 40/53* (2020.01); *A24F 40/65* (2020.01); *A24F 40/95* (2020.01); *B65B 3/04* (2013.01); *B65B 43/54* (2013.01); *B65B 57/04* (2013.01); *B65B 57/06* (2013.01); *B65B 57/18* (2013.01); *A24F 40/40* (2020.01); *G05B 15/02* (2013.01)

(56) References Cited

U.S. PATENT DOCUMENTS

| | | | |
|---|---|---|---|
| 2016/0150824 A1* | 6/2016 | Memari | H02J 7/00 |
| | | | 131/329 |
| 2017/0099878 A1 | 4/2017 | Murison et al. | |
| 2017/0208862 A1* | 7/2017 | Li | H01M 10/0525 |
| 2018/0029866 A1 | 2/2018 | Scott et al. | |
| 2021/0145050 A1* | 5/2021 | Ricketts | A24F 40/40 |

FOREIGN PATENT DOCUMENTS

| | | |
|---|---|---|
| WO | 2016096337 A1 | 6/2016 |
| WO | 2020074929 A1 | 4/2020 |

OTHER PUBLICATIONS

"Search Report received for Great Britain Patent Application No. 2108805.9, mailed on Jul. 26, 2021", 4 pages.

"Search Report received for Great Britain Patent Application No. 2108805.9, mailed on Sep. 15, 2021", 5 pages.

"International Preliminary Report on Patentability received for PCT Patent Application No. PCT/GB2021/052740, mailed on May 4, 2023", 10 pages.

* cited by examiner

REFILLING DEVICE, REFILLING APPARATUS AND METHOD

PRIORITY CLAIM

The present application is a National Phase entry of PCT Application No. PCT/GB2021/052740, filed Oct. 22, 2021, which claims priority from GB Application No. 2016760.7, filed Oct. 22, 2020 and GB Application No. 2108805.9, filed Jun. 18, 2021, each of which hereby fully incorporated herein by reference.

TECHNICAL FIELD

The present disclosure relates to refilling devices, refilling apparatuses and methods of refilling articles of aerosol provision systems.

BACKGROUND

Electronic aerosol provision systems such as electronic cigarettes (e-cigarettes) generally contain an aerosol-generating material, such as a reservoir of a source liquid containing a formulation, typically including nicotine, or a solid material such as a tobacco-based product, from which an aerosol is generated for inhalation by a user, for example through heat vaporization. Thus, an aerosol provision system will typically comprise an aerosol generator, e.g. a heating element, arranged to aerosolize a portion of aerosol-generating material to generate an aerosol in an aerosol generation region of an air channel through the aerosol provision system. As a user inhales on the device and electrical power is supplied to the aerosol generator, air is drawn into the device through one or more inlet holes and along the air channel to the aerosol generation region, where the air mixes with the vaporized aerosol generator and forms a condensation aerosol. The air drawn through the aerosol generation region continues along the air channel to a mouthpiece, carrying some of the aerosol with it, and out through the mouthpiece for inhalation by the user.

It is common for aerosol provision systems to comprise a modular assembly, often having two main functional parts, namely an aerosol provision device and an article. Typically the article will comprise the consumable aerosol-generating material and the aerosol generator (heating element), while the aerosol provision device part will comprise longer-life items, such as a rechargeable battery, device control circuitry and user interface features. The aerosol provision device may also be referred to as a reusable part or battery section and the article may also be referred to as a consumable, disposable/replaceable part, cartridge or cartomizer.

The aerosol provision device and article are mechanically coupled together at an interface for use, for example using a screw thread, bayonet, latched or friction fit fixing. When the aerosol-generating material in an article has been exhausted, or the user wishes to switch to a different article having a different aerosol-generating material, the article may be removed from the aerosol provision device and a replacement article may be attached to the device in its place. Alternatively, some articles are configured such that, after the aerosol-generating material in the article has been exhausted, the article can be refilled with more aerosol-generating material, thereby allowing the article to be reused. In this example, the user is able to refill the article using a separate reservoir of aerosol-generating material. The aerosol-generating material used to refill the article may be the same or different to the previous aerosol-generating material in the article, thereby allowing the user to change to a different aerosol-generating material without purchasing a new article.

Refilling the article with aerosol-generating material extends the life of the article as its use is no longer limited by the volume or amount of aerosol-generating material that the article can hold. As a result, the use of the article may be limited by other factors, such as the life of individual components within the article. Continuous use of the article may therefore result in degradation or fault developing in components within the article. The article may therefore become less reliable, the operation of the article less predictable or the article may stop working entirely, each of which has a negative impact on the user experience.

Various approaches are described herein which seek to help address or mitigate some of the issues discussed above.

SUMMARY

The disclosure is defined in the appended claims.

In accordance with some embodiments described herein, there is provided a refilling device for an article of an aerosol provision system comprising refilling control circuitry configured to facilitate the transfer of aerosol-generating material from a reservoir to the article in response to detecting that the article has been received by the refilling device.

The refilling control circuitry can be configured to determine an amount of aerosol generating material in the article in response to detecting that the article has been received by the refilling device. The refilling control circuitry can be configured to facilitate the transfer of aerosol generating material from the reservoir to the article in response to determining that the amount of aerosol generating material in the article is less that an article threshold. An amount of aerosol generating material transferred from the reservoir to the article can be based on the amount of aerosol generating material in the article.

The refilling control circuitry can be configured to facilitate the transfer of aerosol-generating material from a reservoir to the article in response to detecting that the reservoir has been received by the refilling device. The refilling control circuitry can be configured to determine an amount of aerosol generating material in the reservoir in response to detecting that the reservoir has been received by the refilling device. The refilling control circuitry can be configured to facilitate the transfer of aerosol generating material from the reservoir to the article in response to determining that the amount of aerosol generating material in the reservoir is greater than a reservoir threshold. The amount of aerosol generating material transferred from the reservoir to the article can be based on the amount of aerosol generating material in the reservoir.

The aerosol provision system can comprise the article and an aerosol provision device, and the refilling control circuitry can be configured to transfer electrical power to the aerosol provision device for charging a power source of the aerosol provision device in response to detecting that the aerosol provision device has been received by the refilling device.

The aerosol provision system can comprise the article and an aerosol provision device, and the article is received by an article interface of the refilling device and the aerosol provision device is received by a device interface, wherein the device interface is separate from the article interface. The device interface can be located on a different side of the desktop refilling device to the article interface. The device interface can be configured to receive the aerosol provision device in an orientation perpendicular to an orientation in which the article interface is configured to receive the article.

The refilling device can be a desktop refilling device. The desktop refilling device can comprise a mains power supply. The desktop refilling device can comprise a flat surface to facilitate storage of the desktop refilling device on another flat surface.

In accordance with some embodiments described herein, there is provided a method of refilling an article of an aerosol provision system, the method performed by a refilling device and comprising facilitating the transfer of aerosol-generating material from a reservoir to the article in response to detecting that the article has been received by the refilling device. A computer readable storage medium comprising instructions which, when executed by a processor, can perform the method:

In accordance with some embodiments described herein, there is provided a refilling apparatus for an article of an aerosol provision system comprising an article interface configured to receive the article, a reservoir interface configured to receive a reservoir with a volume at least 10 times greater than a volume of the article, and refilling control circuitry configured to facilitate the transfer of aerosol-generating material from the reservoir to the article.

The article interface can comprise a holder configured to slide between an open configuration and a closed configuration, wherein the holder is at least partially located outside a housing of the refilling apparatus in the open configuration and the holder is located substantially within the housing in the closed configuration. The holder can be is configured to slide into and out of an article opening in the housing, and an outer surface of the holder is configured to close the article opening and lie flush with housing when the holder is in the closed configuration.

The refilling control circuitry can be configured to facilitate the transfer of aerosol-generating material from the reservoir to the article when the holder is in the closed configuration.

The holder can be configured to receive the article when the holder is in the open configuration. The holder can be a tray configured to receive the article from above such that the article rests on the tray when the refilling apparatus is located on a horizontal surface. The tray can comprise a trough with a size and shape substantially conforming to a perimeter size and shape of the article.

The holder can be configured to receive the article in a horizontal orientation when the refilling apparatus is located on a horizontal surface. The holder can be configured to move in a horizontal direction when the refilling apparatus is located on a horizontal surface.

The refilling control circuitry can be further configured to operate a motor connected to the holder to slide the holder between the open configuration and the closed configuration. The refilling control circuitry can be configured to operate the motor to slide the holder to the closed configuration in response to the article being received by the holder. The refilling control circuitry can be configured to operate the motor to slide the holder to the open configuration in response to the transfer of aerosol-generating material from the reservoir to the article.

The refilling control circuitry can be configured to operate an indicator light on the refilling device based on the transfer of aerosol-generating material from the reservoir to the article. The indicator light can be located on the article interface, or the article interface can comprise a holder configured to slide into and out of an article opening in a housing of the refilling apparatus, and the indicator light surrounds the article opening on the housing.

The reservoir interface can comprise a holder with a retaining mechanism configured to receive and retain the reservoir. The retaining mechanism can be a spring clip.

The reservoir interface can be located within a reservoir opening in a housing of the refilling apparatus. The housing can comprise an access panel configured to move between an open configuration and a closed configuration, wherein the reservoir interface is configured to receive the reservoir when the access panel is in the open configuration, and the reservoir opening is sealed by the access panel when the access panel is in the closed configuration. The access panel can be a sliding panel. The sliding panel can extend around substantially part of or substantially all of the perimeter of the housing.

The article interface can comprise a holder configured to slide between an open configuration and a closed configuration, wherein the holder slides in a direction perpendicular to a direction the access panel moves between the open configuration and the closed configuration.

The refilling apparatus can be a desktop refilling device. The desktop refilling device can comprise a mains power supply. The desktop refilling device can comprise a flat surface to facilitate storage of the desktop refilling device on another flat surface.

In accordance with some embodiments described herein, there is provided

In accordance with some embodiments described herein, there is provided a refilling apparatus for an article of an aerosol provision system comprising an article interface configured to receive the article, a reservoir interface configured to receive a reservoir with a volume of 10 ml or more, and refilling control circuitry configured to facilitate the transfer of aerosol-generating material from the reservoir to the article.

The article interface can comprise a holder configured to slide between an open configuration and a closed configuration, wherein the holder is at least partially located outside a housing of the refilling apparatus in the open configuration and the holder is located substantially within the housing in the closed configuration. The holder can be configured to slide into and out of an article opening in the housing, and an outer surface of the holder is configured to close the article opening and lie flush with housing when the holder is in the closed configuration.

The refilling control circuitry can be configured to facilitate the transfer of aerosol-generating material from the reservoir to the article when the holder is in the closed configuration.

The holder can be configured to receive the article when the holder is in the open configuration. The holder can be a tray configured to receive the article from above such that the article rests on the tray when the refilling apparatus is located on a horizontal surface. The tray can comprise a trough with a size and shape substantially conforming to a perimeter size and shape of the article.

The holder can be configured to receive the article in a horizontal orientation when the refilling apparatus is located on a horizontal surface. The holder can be configured to move in a horizontal direction when the refilling apparatus is located on a horizontal surface.

The refilling control circuitry can be configured to operate a motor connected to the holder to slide the holder between the open configuration and the closed configuration. The refilling control circuitry is further configured to operate the motor to slide the holder to the closed configuration in response to the article being received by the holder. The refilling control circuitry can be configured to operate the motor to slide the holder to the open configuration in response to the transfer of aerosol-generating material from the reservoir to the article.

The refilling control circuitry can be configured to operate an indicator light on the refilling device based on the transfer of aerosol-generating material from the reservoir to the article. The indicator light can be located on the article interface, or the article interface can comprise a holder configured to slide into and out of an article opening in a housing of the refilling apparatus, and the indicator light surrounds the article opening on the housing.

The reservoir interface can comprise a holder with a retaining mechanism configured to receive and retain the reservoir. The retaining mechanism can be a spring clip.

The reservoir interface can be located within a reservoir opening in a housing of the refilling apparatus. The housing can comprise an access panel configured to move between an open configuration and a closed configuration, wherein the reservoir interface is configured to receive the reservoir when the access panel is in the open configuration, and the reservoir opening is sealed by the access panel when the access panel is in the closed configuration. The access panel can be a sliding panel. The sliding panel can extend around substantially part of or substantially all of the perimeter of the housing. The article interface can comprise a holder configured to slide between an open configuration and a closed configuration, wherein the holder slides in a direction perpendicular to a direction the access panel moves between the open configuration and the closed configuration.

The volume of the reservoir can be greater than a volume of the article.

The refilling apparatus can be a desktop refilling device. The desktop refilling device can comprise a mains power supply. The desktop refilling device can comprise a flat surface to facilitate storage of the desktop refilling device on another flat surface.

These aspects and other aspects will be apparent from the following detailed description. In this regard, particular sections of the description are not to be read in isolation from other sections.

BRIEF DESCRIPTION OF DRAWINGS

Embodiments of the disclosure will now be described, by way of example only, with reference to accompanying drawings, in which:

FIGS. 8A and 8B are further schematic diagrams of the refilling device illustrated in Figured 5A and 5B;

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of articles and systems discussed herein which are not described in detail may be implemented in accordance with any conventional techniques for implementing such aspects and features.

The present disclosure relates to aerosol provision systems, which may also be referred to as aerosol provision systems, such as e-cigarettes. Throughout the following description the term "e-cigarette" or "electronic cigarette" may sometimes be used, but it will be appreciated this term may be used interchangeably with aerosol provision system and electronic aerosol provision system.

As noted above, aerosol provision systems (e-cigarettes) often comprise a modular assembly including both a reusable part (aerosol provision device) and a replaceable (disposable) or refillable cartridge part, referred to as an article. Systems conforming to this type of two-part modular configuration may generally be referred to as two-part systems or devices. It is also common for electronic cigarettes to have a generally elongate shape. For the sake of providing a concrete example, certain embodiments of the disclosure described herein comprise this kind of generally elongate two-part system employing refillable cartridges. However, it will be appreciated the underlying principles described herein may equally be adopted for other electronic cigarette configurations, for example modular systems comprising more than two parts, as devices conforming to other overall shapes, for example based on so-called box-mod high performance devices that typically have a more boxy shape.

As described above, the present disclosure relates to (but it not limited to) refilling devices for articles of aerosol provision systems, such as e-cigarettes and electronic cigarettes.

Figure 1:
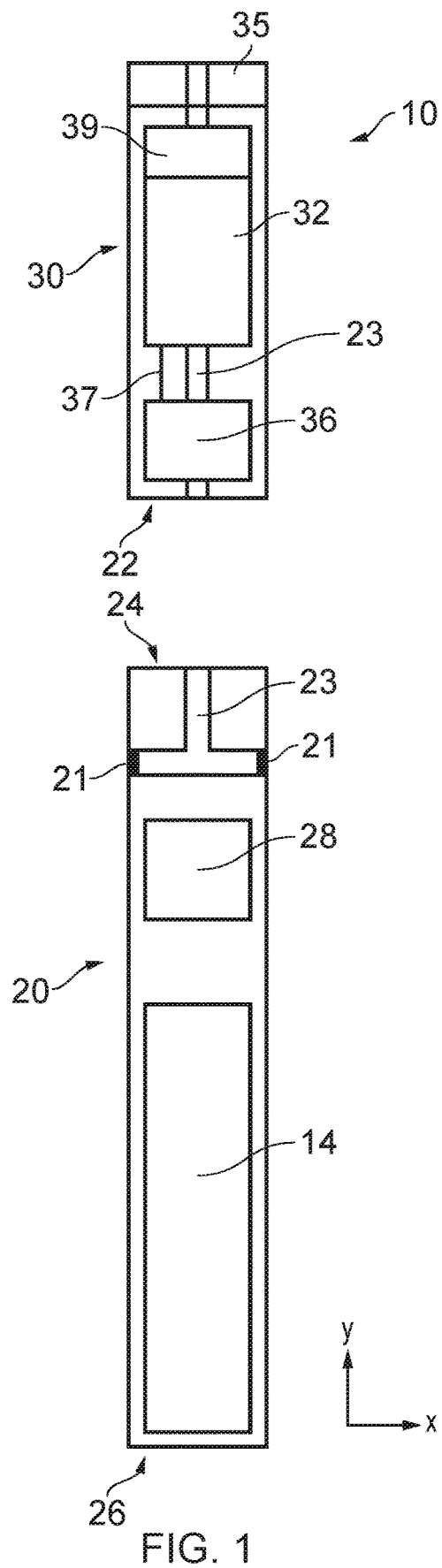
FIG. 1 is a schematic diagram of an aerosol provision system.

FIG. 1 is a highly schematic diagram (not to scale) of an example aerosol provision system 10, such as an e-cigarette, to which embodiments are applicable. The aerosol provision system 10 has a generally cylindrical shape, extending along a longitudinal or y axis as indicated by the axes (although aspects of the disclosure are applicable to e-cigarettes configured in other shapes and arrangements), and comprises two main components, namely an aerosol provision device 20 and an article 30.

The aerosol provision device 20 and article 30 each comprise an interface 22, 24 such that the aerosol provision device 20 and article 30 are mechanically coupled for use. As described above, the interfaces may comprise a screw thread, bayonet, latched or friction fit fixing, wherein the interface 24 on the aerosol provision device 20 and the interface 24 on the article 30 each comprise a complementary fitting or fixture to enable the aerosol provision device 20 and article 30.

The article 30 comprises or consists of aerosol-generating material 32, part or all of which is intended to be consumed during use by a user. An article 30 may comprise one or more other components, such as an aerosol-generating material storage area 39, an aerosol-generating material transfer component 37, an aerosol generation area, a housing, a wrapper, a mouthpiece 35, a filter and/or an aerosol-modifying agent.

An article 30 may also comprise an aerosol generator 36, such as a heating element, that emits heat to cause the aerosol-generating material 32 to generate aerosol in use. The aerosol generator 36 may, for example, comprise combustible material, a material heatable by electrical conduction, or a susceptor. It should be noted that it is possible for the aerosol generator 36 to be part of the aerosol provision device 20 and the article 30 then may comprise the aerosol-generating material storage area 39 for the aerosol-generating material 32 such that, when the article 30 is coupled with the aerosol provision device 20 via the interfaces 22, 24, the aerosol-generating material 32 can be transferred to the aerosol generator 36 in the aerosol provision device 20.

Aerosol-generating material is a material that is capable of generating aerosol, for example when heated, irradiated or energized in any other way. The aerosol-generating material 32 may, for example, be in the form of a solid, liquid or gel which may or may not contain an active substance and/or flavorants. In some embodiments, the aerosol-generating material 32 may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material 32 may for example comprise from about 50 wt %, 60 wt % or of amorphous solid, to about 90 wt %, 95 wt % or 100 wt % of amorphous solid.

The aerosol-generating material comprises one or more ingredients, such as one or more active substances and/or flavorants, one or more aerosol-former materials, and optionally one or more other functional materials such as pH regulators, coloring agents, preservatives, binders, fillers, stabilizers, and/or antioxidants.

The active substance as used herein may be a physiologically active material, which is a material intended to achieve or enhance a physiological response. The active substance may for example be selected from nutraceuticals, nootropics, and psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, *cannabis* or another botanical.

In some embodiments, the active substance comprises nicotine. In some embodiments, the active substance comprises caffeine, melatonin or vitamin B12.

The aerosol provision device 20 includes a power source 14, such as a battery, configured to supply electrical power to the aerosol generator 36. The power source 14 in this example is rechargeable and may be of a conventional type, for example of the kind normally used in electronic cigarettes and other applications requiring provision of relatively high currents over relatively short periods. The battery 14 may be recharged through the charging port (not illustrated), which may, for example, comprise a USB connector.

The aerosol provision device 20 includes device control circuitry 28 configured to control the operation of the aerosol provision system 10 and provide conventional operating functions in line with the established techniques for controlling aerosol provision systems such as electronic cigarettes. The device control circuitry (processor circuitry) 28 may be considered to logically comprise various sub-units/circuitry elements associated with different aspects of the electronic cigarette's operation. For example, depending on the functionality provided in different implementations, the device control circuitry 28 may comprise power source control circuitry for controlling the supply of electrical power from the power source 14 to the aerosol generator 36, user programming circuitry for establishing configuration settings (e.g. user-defined power settings) in response to user input, as well as other functional units/circuitry associated functionality in accordance with the principles described herein and conventional operating aspects of electronic cigarettes. It will be appreciated the functionality of the device control circuitry 28 can be provided in various different ways, for example using one or more suitably programmed programmable computer(s) and/or one or more suitably configured application-specific integrated circuit(s)/circuitry/chip(s)/chipset(s) configured to provide the desired functionality.

The aerosol provision device 20 includes one or more air inlets 21. In use, as a user inhales on the mouthpiece 35, air is drawn into the aerosol provision device 20 through the air inlets 21 and along an air channel 23 to the aerosol generator 36, where the air mixes with the vaporized aerosol-generating material 32 and forms a condensation aerosol. The air drawn through the aerosol generator 36 continues along the air channel 23 to a mouthpiece 35, carrying some of the aerosol with it, and out through the mouthpiece 35 for inhalation by the user. Alternatively, the one or more air inlets 21 may be included on the article 30, such that the air channel 23 is entirely contained within the article 30.

By way of a concrete example, the article 30 comprises a housing (formed, e.g., from a plastics material), an aerosol-generating material storage area 39 formed within the housing for containing the aerosol-generating material 32 (which in this example may be a liquid which may or may not contain nicotine), an aerosol-generating material transfer component 37 (which in this example is a wick formed of e.g., glass or cotton fibers, or a ceramic material configured to transport the liquid from the reservoir using capillary action), an aerosol-generating area containing the aerosol generator 36, and a mouthpiece 35. Although not shown, a filter and/or aerosol modifying agent (such as a flavor imparting material) may be located in, or in proximity to, the mouthpiece 35. The aerosol generator 36 of this example comprises a heater element formed from an electrically resistive material (such as NiCr8020) spirally wrapped around the aerosol-generating material transfer component 37, and located in the air channel 23. The area around the heating element and wick combination is the aerosol-generating area of the article 30.

Figure 2:
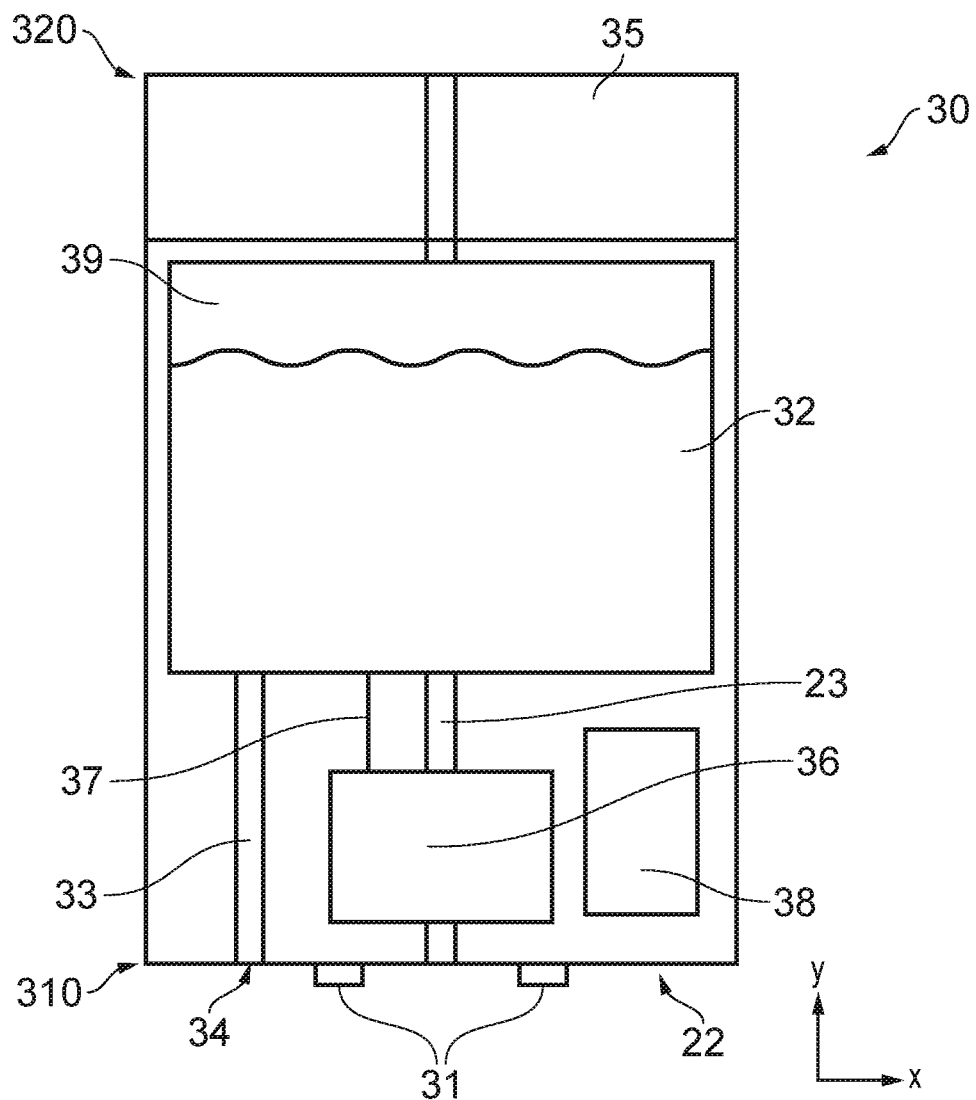
FIG. 2 is a schematic diagram of an example article for use in the aerosol provision system illustrated in FIG. 1.

FIG. 2 is a schematic diagram of an example article 30 for use in the aerosol provision system 10 illustrated in FIG. 1, where the same reference signs have been used for like elements between the article 30 illustrated in FIG. 1 and the article 30 illustrated in FIG. 2. As per the article 30 illustrated in FIG. 1, the article 30 illustrated in FIG. 2 includes an aerosol-generating material storage area 39 for storing an aerosol-generating material 32, an aerosol-generating material transfer component 37, an aerosol generation area containing an aerosol generator 36, and a mouthpiece 35.

The article 30 illustrated in FIG. 2 is configured to be refilled and reused. In other words, the aerosol-generating material storage area 39 of the article 30 illustrated in FIG. 2 can be refilled with aerosol-generating material 32 once some or all of the aerosol-generating material 32 contained in the aerosol-generating material storage area 39 has been exhausted or depleted. To facilitate the refilling or replenishment of aerosol-generating material 32, the article 30 has a refilling tube 33 extending between the aerosol-generating material storage area 39 and the exterior or an outer surface of the housing of the article 30, thereby creating a refilling orifice 34. Aerosol-generating material 32 can then be inserted into the aerosol-generating material storage area 39 via the refilling orifice 34 and refilling tube 33. It will be appreciated, however, that such a configuration of a refilling tube 33 and a refilling orifice 34 is not essential, and the article 30 may comprise any other suitable means of facilitating the refilling of the aerosol-generating material storage area 39 with aerosol generating material 32.

The refilling orifice 34 and/or the refilling tube 33 may be sealable, for example with a cap, one-way valve or septum valve, in order to ensure that aerosol-generating material 32 does not leak out of the refilling orifice 34. In other words, the refilling orifice 34 can comprise a cap, one-way valve or septum valve. Although the refilling orifice 34 is illustrated in FIG. 2 as being on the same end or surface 310 of the article 30 as the air channel 23 and interface 22 with the aerosol provision device 20, this is not essential. The refilling orifice 34 may be located at the end 320 of the article 30 comprising the mouthpiece 35, for example proximate to the outlet of the air channel 23 on the mouthpiece 35, such that the refilling tube 33 extends between the end 320 of the article 30 comprising the mouthpiece 35 and the aerosol-generating material storage area 39. In this case, the article 30 does not necessarily need to be separated from the aerosol-generating device 20 in order to refill the article 30 with aerosol-generating material 32, as the refilling orifice 34 is not obstructed by the aerosol-generating device 20 when the article 30 is coupled with the aerosol provision device 20 via the interfaces 22, 24.

The article 30 illustrated in FIG. 2 also comprises article control circuitry 38 configured to control the operation of the article 30 and store parameters and/or data associated with the article 30. The parameters associated with the article 30 may include, for example, a serial number and/or stock keeping unit (SKU) for the article 30 or other means of identifying the article and/or the type of the article 30, a date of manufacture and/or expiry of the article 30, an indication of the number of times the article 30 has been refilled, the capacity of the aerosol-generating material storage area 39 and/or the amount of aerosol-generating material remaining in the aerosol-generating material storage area 39. The parameters associated with the article may include data relating to the aerosol-generating material stored in the aerosol-generating material storage area 39, such as one or more ingredients, the concentration and/or amount of the ingredients and/or one or more flavorants within the aerosol-generating material. As described above in relation to the device control circuitry 28, the article control circuitry 38 can be provided in various different ways, for example using one or more suitably programmed programmable computer(s) and/or one or more suitably configured application-specific integrated circuit(s)/circuitry/chip(s)/chipset(s) configured to provide the desired functionality. For example, the article control circuitry 38 may comprise a microcontroller unit (MCU) or a system on chip (SoC).

The article 30 illustrated in FIG. 2 also comprises one or more connectors 31, such as contact electrodes, connected via electrical wiring to the aerosol generator 36 and the article control circuitry 38. In use, the article 30 is coupled to the aerosol-generating device 20 and the connectors 31 mate with connectors on the aerosol-generating device, thereby allowing electrical power and electrical current to be supplied from the battery 14 of the aerosol-generating device to the aerosol generator 36 and the article control circuitry 38. As illustrated in FIG. 2, the one or more connectors 31 can be located at the same end 310 of the article 30 as the interface 22. Alternative, the one or more connectors 31 may form part of the interface 22 or be located on a different surface of the article 30 to the interface 22, for example a side wall of the article 30 proximate to the end 310 with the interface. It will be appreciated that the one or more connectors 31 can be located on any surface of the article 30 so as to provide a complementary fixture or fitting with equivalent connectors 22 on the aerosol provision device 20 and/or refilling device 40 as described in more detail below.

Figure 3:
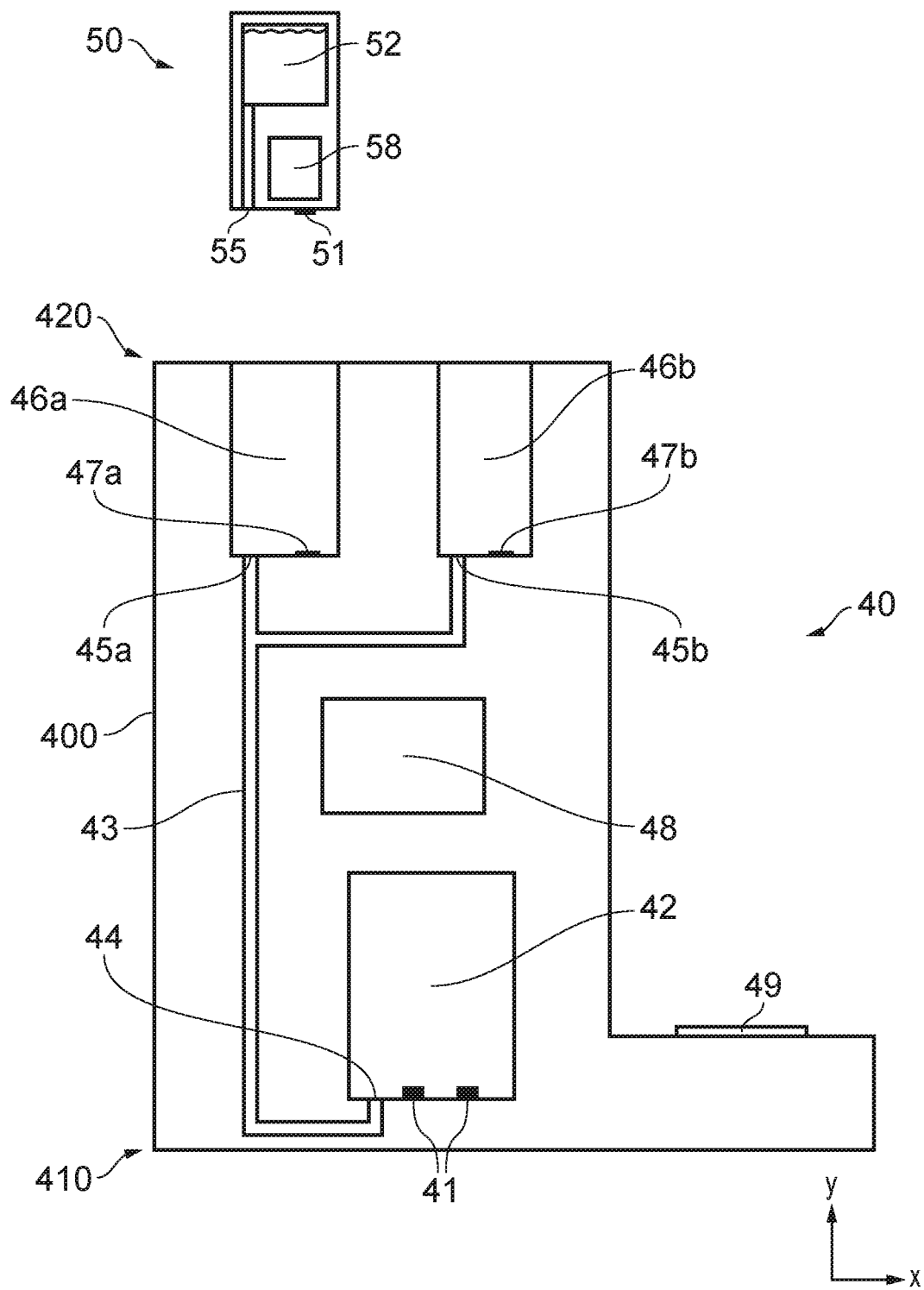
FIG. 3 is a schematic diagram of an example refilling device and a reservoir for refilling the article illustrated in FIG. 2.

FIG. 3 is a schematic diagram of a refilling device 40 for an article of an aerosol provision system, such as the article 30 illustrated in FIG. 2, and a reservoir 50. The reservoir 50 is a disposable/replaceable part which contains aerosol-generating material 52. The refilling device facilitates the transfer of the aerosol-generating material 52 from a reservoir 50 couplable to the refilling device to an article 30 couplable to the refilling device in order to refill or replenish the aerosol-generating material storage area 39 of the article 30 with aerosol-generating material. In other words, the refilling device 40 described herein is a refilling apparatus for an article 30 of an aerosol provision system 10. The article 30 can then be reused as part of the aerosol provision system 10 described above, whilst the reservoir 50 can be disposed of when the aerosol-generating material 52 within the reservoir 50 has been depleted. This allows a single article 30 to be refilled using one or more reservoirs, thereby increasing the number of uses of a single article 30.

The refilling device 40 illustrated in FIG. 3 can be considered a desktop refilling device 40. A desktop refilling device is a refilling device designed for regular use at a single location on or near a desk, table or other solid surface due to its size and power requirements. For example, desktop refilling device 40 can comprise an external power supply, such as a mains power or supply to which the refilling device 40 can be coupled, attached or otherwise connected. The refilling device 40 may also comprise an internal power source, such as a battery, configured to supply electrical power to the components of the refilling device 40 in the event that the external power supply is not available or unexpectedly cuts out in the middle of operation.

As illustrated in FIG. 3, a desktop refilling device 40 can also comprise a flat surface 410 to facilitate storage of the desktop refilling device on another flat surface, such as a desk, table or other solid surface. This allows the desktop refilling device 40 to rest stably and level on another surface. The flat surface 410 may comprise a non-slip mat or coating in order to prevent the desktop refilling device from being knocked or pushed. The non-slip mat may be made of rubber or any other suitable material with a high coefficient of friction. More generally, the desktop refilling device 40 illustrated in FIG. 3 has the flat surface 410 at a first end of the refilling device and a second surface 420 at a second end of the refilling device 40. The second end is opposite the first end, such that a major axis or length of the refilling device 40 extends between the first end and the second end. When the first end and flat surface 410 are placed or otherwise located on a horizontal surface (e.g. aligned with x-axis in FIG. 3), the major axis or length of the refilling device 40 extends in a vertical direction (aligned with the y-axis in FIG. 3) between the first end and the second end. The flat surface 410 can therefore be considered as the base, bottom or foot of the refilling device 40 whilst the second surface 420 can be considered the top or upper surface of the refilling device 40.

As illustrated in FIG. 3, the refilling device 40 comprises an article interface 42 configured to receive the article 30. The article interface 42 may comprise a slot, tray, opening or aperture on the refilling device 40 into or onto which the article 30 is placed or coupled. Alternatively the article interface 42 may comprise a lead or other cable which is attachable or otherwise connectable to the article 30. Although one article interface 42 is illustrated in FIG. 3, the refilling device 40 may comprise more than one article interface 42, for example three, five or ten, depending on the specific design of the refilling device 40. In this case, two or more of the article interfaces 42 may be different such that the refilling device 40 is capable of receiving different types of article, or two or more of the article interfaces 42 may be the same such that the refilling device 40 is capable of receiving multiple articles of the same type.

As illustrated in FIG. 3, the article interface 42 is configured to receive the article 30 when the article 30 is separated from the aerosol provision device 20. As set out above with reference to FIG. 1, when used as an aerosol provision system 10, the aerosol provision device and article 30 are mechanically coupled together via interfaces 22, 24. The article interface 42 is configured such that, before the article 30 is received by the article interface 42, the article is detached, disconnected or otherwise separated from the aerosol provision device 20 such that only the article 30 is received by the article interface 42 (in other words, the aerosol provision system 20 is not received by the article interface 42). This means that the aerosol provision device 20 is not required in order for the article 30 to be refilled with aerosol generating material 32.

The refilling device 40 also comprises one or more reservoir interfaces 46 configured to receive a reservoir 50. In the same fashion as described above in relation to the article interface 42, each of the reservoir interfaces 46 may comprise a slot, tray, opening or aperture on the refilling device 40 into or onto which the reservoir 50 is placed or coupled. Alternatively, each reservoir interface 46 may comprise a lead or other cable which is attachable or otherwise connectable to the reservoir 50. Although two reservoir interfaces 46 are illustrated in FIG. 3, this is not essential and the refilling device 40 may comprise fewer or more reservoir interfaces 46, for example one, three, five or ten, depending on the specific design of the refilling device 40.

As illustrated in FIG. 3, the one or more reservoir interfaces 46 can be located above the article interface 42. In other words the one or more reservoir interfaces 46 are located at a higher position than the article interface 42 such that, in use, the transfer of aerosol-generating material 52 from the reservoir 50 to the article 30 is gravity assisted, thereby reducing the energy required to transfer aerosol-generating material 52. The x-axis shown in FIG. 3 aligns with a horizontal direction and the y-axis shown in FIG. 3 aligns with a vertical direction. A first end of the refilling device 40 comprises the flat surface 410 to allow the refilling device is located on a horizontal surface. As illustrated in FIG. 3, the one or more reservoir interfaces 46 are located further (in other words, a greater distance along the major axis or length of the refilling device 40) from the flat surface 410 than the above the article interface 42. This ensures that, when the flat surface 410 is placed on another flat surface (such as a horizontal surface), such as in the case of a desktop refilling device as described above, the flat surface 410 aligns with the x-axis (or horizontal direction), and the one or more reservoir interfaces 46 are located at a higher position than the article interface 42.

The refilling device 40 also comprises refilling control circuitry 48 configured to control the operation of the refilling device 40. In particular, the refilling control circuitry 48 is configured to facilitate the transfer of aerosol-generating material 52 from a reservoir 50 to the article 30. As described above in relation to the device control circuitry 28, the refilling control circuitry 48 can be provided in various different ways, for example using one or more suitably programmed programmable computer(s) and/or one or more suitably configured application-specific integrated circuit(s)/circuitry/chip(s)/chipset(s) configured to provide the desired functionality. For example, the refilling control circuitry 48 may comprise a microcontroller unit (MCU) or a system on chip (SoC).

The refilling device 40 also comprises a housing 400 which contains and encloses the components of the refilling device 40. As illustrated in FIG. 3, the article interface 42 and the one or more reservoir interfaces 46 are located inside the housing 400 of the refilling device. The article interface 42 is therefore configured to enclose the article 30 and the one or more reservoir interfaces 46 configured to enclose the reservoir 50 inside the housing 400 of the refilling device 40 during the transfer of aerosol-generating material 52 from the reservoir 50 to the article 30. The article interface 42 and/or the reservoir interfaces 46 may comprise a door, cover or flap which can be shut when the article 30 and reservoir 50 are respectively received by the article interface 42 and the one or more reservoir interfaces 46 such that the article 30 and the reservoir are fully contained within or otherwise enclosed by the housing 400 of the refilling device 40.

As described above, the reservoir 50 comprises aerosol-generating material 52 for transferring, by the refilling device 40, to the article 30 in order to refill or replenish the aerosol-generating material 32 in the aerosol-generating material storage area 39 of the article 30.

The reservoir 50 illustrated in FIG. 3 also comprises reservoir control circuitry 58 configured to control the reservoir 50 and store parameters and/or data associated with the reservoir 50. The parameters associated with the reservoir 50 may include, for example data indicative of an amount of aerosol-generating material 52 stored in the reservoir 50, data relating to the aerosol-generating material 52 stored in the reservoir 50, such as one or more ingredients, the concentration and/or amount of the ingredients and/or one or more flavorants within the aerosol-generating material 52. The data may also comprise an identifier, such as a serial number and/or SKU for the reservoir 50 or other means of identifying the reservoir 50 and/or the type of the reservoir 50, and a date of manufacture and/or expiry of the reservoir 50. As described above in relation to the device control circuitry 28, the reservoir control circuitry 58 can be provided in various different ways, for example using one or more suitably programmed programmable computer(s) and/ or one or more suitably configured application-specific integrated circuit(s)/circuitry/chip(s)/chipset(s) configured to provide the desired functionality. For example, the reservoir control circuitry 58 may comprise a microcontroller unit (MCU) or a system on chip (SoC). Alternatively, the reservoir control circuitry 58 may comprise a code printed onto the reservoir, such as a barcode or QR code, or an NFC chip or other form of passive tag.

The reservoir 50 can have a volume of 10 ml or more, for example 20 ml, 50 ml or 100 ml.

In other words, the reservoir is configured to contain 10 ml or more of aerosol-generating material 52 when the reservoir 50 is filled with aerosol generating material 52. At least one of the one or more reservoir interfaces 46 is then configured to receive a reservoir with a volume of 10 ml or more.

The reservoir 50 can also have a larger volume than the article 30. For example, the volume of the reservoir can be at least 5 times greater than the volume of the article, for example times, 20 times or 50 times greater. In other words, the reservoir is configured to contain, when filled with aerosol-generating material 52, a volume of aerosol-generating material 52 at least 5 times greater than the aerosol-generating material storage area 39 of the article 30. This allows the same reservoir 50 to be used to refill the article at least 5 times. At least one of the one or more reservoir interfaces 46 is then configured to receive a reservoir with a volume at least times greater than a volume of the article the article interface 42 is configured to receive.

The refilling device 40 illustrated in FIG. 3 also comprises one or more connectors 41, such as contact electrodes, connected via electrical wiring to the refilling control circuitry 48 and the power source (not illustrated). The connectors 41 are located proximate to or as part of the article interface 42. This facilitates communication between the refilling control circuitry 48 and the article control circuitry 38; the connectors 31 on the article 30 mate with the connectors 41 on the refilling device 40 when the article 30 is received by the article interface 42, thereby allowing power to be supplied from the refilling device 40 to the article control circuitry 38 and electrical signals to be transferred between the refilling control circuitry 48 and the article control circuitry 38. The connectors 41 may be arranged relative to the article interface 42 in a pattern and position matching/mirroring the connectors 31 on the article 30 in order to facilitate the mating of the connectors 31 on the article 30 and the connectors 41 on the refilling device 40 when the article is received by the article interface 42.

In the same fashion, the refilling device 40 illustrated in FIG. 3 also comprises one or more connectors 47, such as contact electrodes, located proximate to or as part of each of the reservoir interfaces 46 and connected via electrical wiring to the refilling control circuitry 48 and the power source (not illustrated). The connectors 47 mate with the connectors 51 on the reservoir 50 when the reservoir 50 is received by the reservoir interface 46, thereby allowing power to be supplied from the refilling device 40 to the reservoir control circuitry 58 and electrical signals to be transferred between the refilling control circuitry 48 and the reservoir control circuitry 58. The connectors 47 may be arranged relative to the reservoir interface 46 in a pattern and position matching/mirroring the connectors 51 on the reservoir 50 in order to facilitate the mating of the connectors 51 on the reservoir 50 and the connectors 47 on the refilling device 40 when a reservoir 50 is received by one of the reservoir interfaces 46.

Although the connectors 31, 41, 47, 51 are described herein as physical electrical connectors between the article, the refilling device and the reservoir, in an alternative implementation one or more of the electrical connections between the respective components may be a wireless connection, such as NFC, RFID, or inductive coupling.

The refilling device 40 illustrated in FIG. 3 also comprises a refilling outlet 44 located proximate to or as part of the article interface 42, a refilling inlet 45 located proximate to or as part of each of the reservoir interfaces 46, and a duct 43 connecting each refilling inlet 45 to the refilling outlet 44.

The refilling outlet 44 is configured to mate with the refilling orifice 34 on the article 30 when the article is received by the article interface 42, and each refilling inlet 45 is configured to mate with a reservoir outlet 55 when a reservoir 50 is received by the corresponding reservoir interface 46. The duct 43 is configured to facilitate the transfer of aerosol-generating material 52 from each of the refilling inlets 45 to the refilling outlet 44, thereby providing a transfer path for aerosol-generating material 52 from the reservoir 50 through the refilling device 40 and into the article 30.

Although the refilling outlet 44 is illustrated in FIG. 3 as being on the same end or surface of the article interface 42 as the connectors 41, this is not essential. The refilling outlet 44 may be located anywhere proximate to or in the article interface 42 relative to the connectors 41 in order for the refilling outlet 44 to mate with the refilling orifice 34 on the article 30 whilst the connectors 41 on the refilling device 40 mate with the connectors 31 on the article 30 when the article 30 is received by the article interface 30. Similarly, the refilling inlet 45 may be located anywhere proximate to or in each reservoir interface 46 relative to the connectors 47 in order for the refilling inlet 45 to mate with the reservoir outlet 55 on the reservoir 50 whilst the connectors 47 on the refilling device 40 mate with the connectors 51 on the reservoir 50 when a reservoir 50 is received by a reservoir interface 46.

Further, as described above, the refilling device 40 may be configured to receive different types, designs or configuration of article 30 using the same article interface 42. In this case, there may be multiple configurations of connectors 41 and/or refilling outlets 44 proximate to or in the article interface 42 in order to facilitate the same article interface 42 receiving different types, designs or configurations of article 30. Equally, there may be multiple configurations of connectors 47 and/or refilling inlets 45 proximate to or in each reservoir interface 46 in order to facilitate the same reservoir interface 46 receiving different types, designs or configurations of reservoir 50. Alternatively or in addition, the configuration of connectors 47 and/or refilling inlets 45 proximate to or in the one or more of the reservoir interfaces 46 may be different such that different reservoir types are received by different reservoir interfaces 46 of the same refilling device 40.

One or more of the refilling outlet 44, the refilling inlets 45, the reservoir outlet 55 and the duct 43 may also include a means of controlling the rate and/or direction of transfer of the aerosol-generating material 52, for example a ball valve, needle valve or diaphragm to control the rate of transfer and/or a one way valve such as a check valve or non-return valve to control the direction of transfer. For example, a one way valve may be located at or proximate to each of the refilling outlet 44, the refilling inlets 45 and the reservoir outlets 55 to ensure that aerosol-generating material 52 can only be transferred from the reservoir 50 to the refilling device 40 and from the refilling device 40 to the article 30, whilst a single ball valve or diaphragm may be located on or in the duct 43 of the refilling device 40 in order to control the flow rate of aerosol-generating material 52 from the reservoir 50 through the refilling device 40 and into the article 30. Equally, a ball valve or diaphragm may be located proximate to each refilling inlet 45 in order to independently control the rate of transfer of aerosol-generating material 52 into each of the refilling inlets 45 or from each of the refilling inlets 45 into the duct 43. For example, this allows the refilling control circuitry 48 to prevent a first aerosol-generating material 52 being transferred from a first reservoir 50 whilst a second aerosol-generating material 52 is being transferred from a second reservoir 50 to the article 30. This also allows the refilling control circuitry 48 to facilitate the transfer the first aerosol-generating material 52 from the first reservoir 50 and the second aerosol-generating material 52 from the second reservoir 50 simultaneously to the article 30, but at different transfer rates, thereby creating an aerosol-generating material 32 in the article 30 containing a mixture of the first aerosol-generating material 52 and the second aerosol-generating material 52 at different concentrations.

The refilling device 40 illustrated in FIG. 3 also comprises a device interface 49 configured to receive the aerosol provision device 20. As described above, the article interface 42 is configured to receive the article 30 when the article 30 is separated from the aerosol provision device 20, such that the aerosol provision device 20 is not received by the article interface 42. The aerosol provision device 20 can then be received by a separate device interface 49 as illustrated in FIG. 3. This allows the device interface 49 and the article interface 42 to be located separately on the refilling device 40, for example on different sides of the refilling device such that the aerosol provision device 20 can be coupled to the refilling device 40 independently of the article 30. As described above, this also means that the aerosol provision device 20 is not required in order for the article 30 to be refilled with aerosol generating material 32.

The device interface 49 can be configured to receive the aerosol provision device 20 in order to supply electrical power from the refilling device 40 to the aerosol provision device 20. This electrical power can be used, for example, to recharge the power source or battery 14 of the aerosol provision device 20 and to facilitate the transfer of electrical signals between the refilling control circuitry 48 and the device control circuitry 28. This allows the user to use the refilling device 40 as a means of charging the aerosol provision device 20 whilst the article 30 is being replenished with aerosol-generating material 32, thereby reducing the number of associated devices needed to operate and maintain the aerosol provision system 10. The device interface 49 may be a wired interface, such as using electrical connectors as described above, or a wireless interface such as inductive or capacitive coupling. The device interface 49 may also be configured to the transfer of data between the refilling control circuitry 48 and the device control circuitry 28. The refilling control circuitry 48 may be configured to read data from the aerosol provision device and/or write data to the aerosol provision device 20, for example to perform a software update, thereby installing an updated version of software onto the device control circuitry 28.

As set out above, the refilling device 40 facilitates the transfer of aerosol-generating material 52 from a reservoir 50 couplable to the refilling device 40 to an article 30 couplable to the refilling device 40 in order to refill or replenish the article 30 so that it can be reused as part of the aerosol provision system 10. In particular, the refilling control circuitry 48 is configured to facilitate the transfer of aerosol-generating material 52 from the reservoir 50 to the article 30 in response to detecting that the article 30 has been received by the refilling device 40.

By way of a concrete example, when a reservoir 50 is received by one of the reservoir interfaces 47, the connectors 47 located proximate to or in the corresponding reservoir interface 46 mate with the connectors 51 on the reservoir 50 and the refilling inlet 45 located proximate to or in the corresponding reservoir interface 46 mates with the reservoir outlet 55. When an article 30 is received by the article interface 42, the connectors 41 located proximate to or in the article interface 42 mate with the connectors 31 on the article 30 and the refilling outlet 45 mates with the refilling orifice 34 on the device 30. The refilling control circuitry 48 is then configured to facilitate the transfer of aerosol-generating material 52 from the reservoir 50 to the article 30 by facilitating the transfer of aerosol-generating material 52 from the reservoir 50 into the duct 42 of the refilling device 40 via the reservoir outlet 51 and the refilling inlet 45, and from the duct 42 of the refilling device 40 into the aerosol-generating material storage area 39 of the article 30 via the refilling outlet 44, the refilling orifice 34 and the refilling tube 33.

In the examples where the refiling device 40 has a plurality of reservoir interfaces 46, the refilling control circuitry 48 is configured to selectively facilitate the transfer of aerosol-generating material 52 from a reservoir 50 received by one of the reservoir interfaces 46, for example in response to a determination that only one of the reservoir interfaces 46 has received a reservoir or in response to a selection of a particular reservoir 50 from which aerosol-generating material 52 should be transferred, for example a user input or a determination based on one or more parameters of each of the reservoirs 50 stored on the respective reservoir control circuitry 58. In this case, the refilling control circuitry 48 is configured to receive, from a user of the refilling device 40, a selection of one or more reservoir interfaces 46 and selectively facilitate the transfer of aerosol-generating material 52, from each reservoir 50 connected to one of the one or more selected reservoir interfaces 46, to the article 30 when the article 30 is coupled to the refilling device. In other words, the refilling control circuitry 48 is configured to only transfer aerosol-generating material 52 from a reservoir 50 connected to a selected reservoir interface 46, and prevent aerosol-generating material 52 from being transferred from any other reservoir 50 connected to the refilling device 40.

Although not illustrated, in some examples, the refilling device 40 can comprise a tank, container or other such receptacle for storing aerosol-generating material 52 received from the reservoir 50, for example when a reservoir 50 is received by the reservoir interface 46 without an article 30 being received by the article interface 42, thereby allowing the reservoir 50 to be disconnected from the reservoir interface 46 before an article 30 is received by the article interface 42. In this case, the aerosol-generating material 52 is stored in the receptacle of the refilling device 40 until such a time that it can be transferred to an article 30 received by the article interface 42. In this case, control circuitry 48 of the refilling device 40 is configured to facilitate the transfer of aerosol-generating material 52 from the reservoir 50 to the receptacle, and subsequently and separately to facilitate the transfer of the aerosol-generating material 52 from the receptacle to the article 42.

The receptacle of the refilling device 40 can also be used to facilitate the mixing of aerosol-generating material 52 before it is transferred to the article 30. For example, if a first reservoir interface 46 receives a first reservoir 50 containing a first aerosol-generating material 52 and a second reservoir interface 46 receives a second reservoir 50 containing a second aerosol-generating material 52, then the refilling control circuitry 48 can be configured to facilitate the transfer of the first aerosol-generating material 52 from the first reservoir 50 into the receptacle, and facilitate the transfer of the second aerosol-generating material 52 from the second reservoir into the receptacle. The first aerosol-generating material 52 and the second aerosol-generating material 52 can then be mixed in the receptacle, and the mixture of the first aerosol-generating material 52 and the second aerosol-generating material 52 transferred to the article 30.

Figure 4:
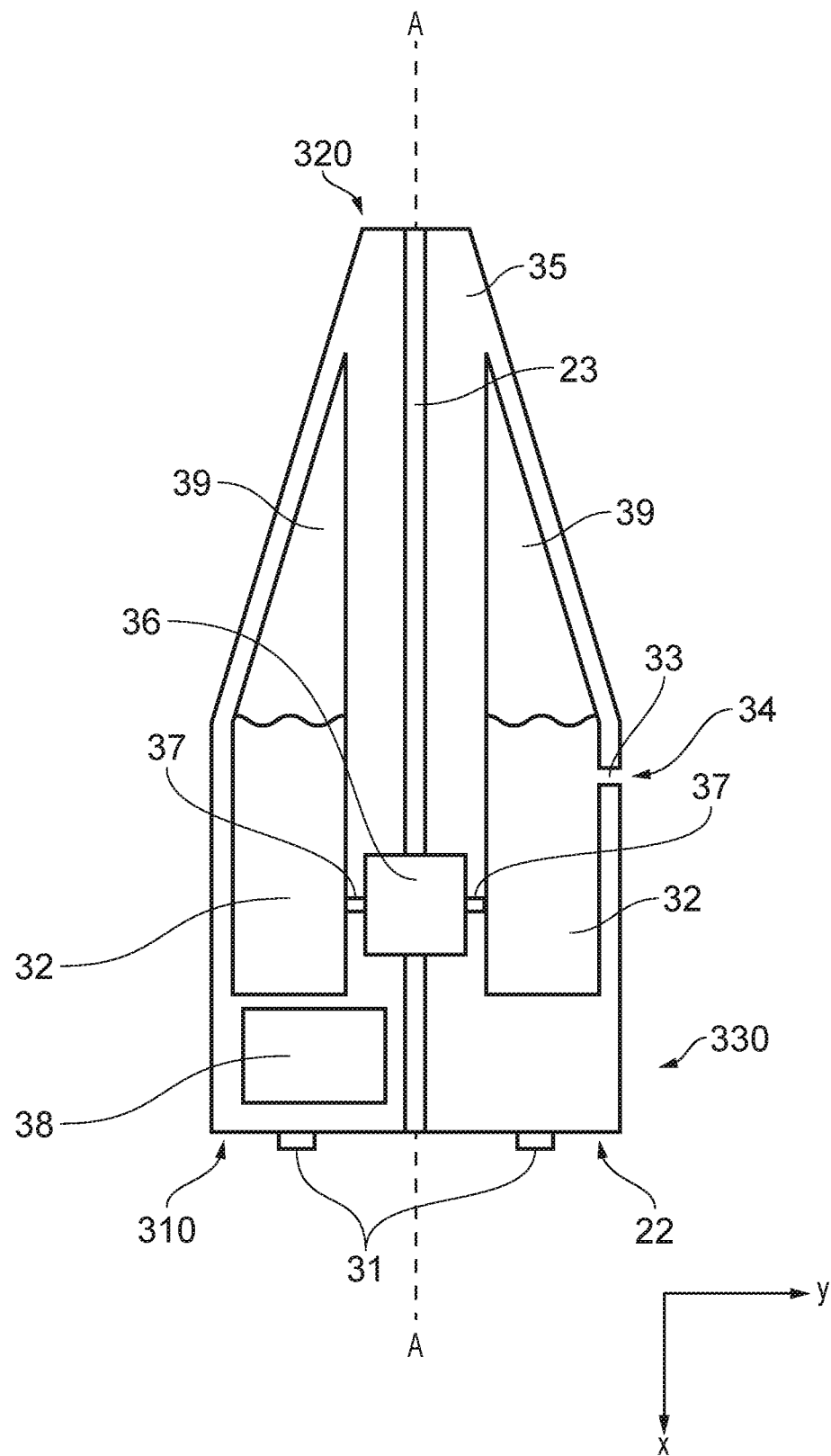
FIG. 4 is a schematic diagram of an example article for use in the aerosol provision system illustrated in FIG. 1.

FIG. 4 is a schematic diagram of an example article 30 for use in the aerosol provision system 10 illustrated in FIG. 1, where the same reference signs have been used for like elements between the article 30 illustrated in FIG. 1 and FIG. 2 and the article 30 illustrated in FIG. 4. As per the article 30 illustrated in FIGS. 1 and 2, the article 30 illustrated in FIG. 4 includes an aerosol-generating material storage area 39 for storing an aerosol-generating material 32, an aerosol-generating material transfer component 37, an aerosol generation area containing an aerosol generator 36, a mouthpiece 35, article control circuitry 38 and one or more one or more connectors 31. Although the aerosol-generating material storage area 39 is illustrated in FIG. 4 as being either side of the aerosol generator 36 and the air channel 23, the aerosol-generating material storage area 39 can be a single component entirely or substantially surrounding the aerosol generator 36 and the air channel 23.

Like the article 30 illustrated in FIG. 2, the article 30 illustrated in FIG. 4 is configured to be refilled and reused. In other words, the aerosol-generating material storage area 39 of the article 30 illustrated in FIG. 4 can be refilled with aerosol-generating material 32 once some or all of the aerosol-generating material 32 contained in the aerosol-generating material storage area 39 has been exhausted or depleted. To facilitate the refilling or replenishment of aerosol-generating material 32, the article 30 has a refilling tube 33 extending between the aerosol-generating material storage area 39 and the exterior or an outer surface of the housing of the article 30, thereby creating a refilling orifice 34. In the example illustrated in FIG. 4, the refilling orifice 34 is located on a side wall 330 of the article 30. In other words, the interface 22 to couple the article 30 to the aerosol provision device 20 and one or more connectors 31 are located at a first end 310 of the article 30. A second end 320 is located opposite the first end 310 along an axis extending between the first end 310 and the second end 320 (the x-axis in the example illustrated in FIG. 4). The refilling orifice 34 is then located on a side wall 330 of the article 30 between the first end 310 and the second end 320.

As illustrated in FIG. 4, the article 30 is generally elongate with an axis A (parallel with the x-axis in FIG. 4) extending centrally through the article 30 between the first end 310 and the second end 320. The refilling orifice 34 is located on the sidewall 330 at a distance furthest from this central axis A. In other words, the refilling orifice 34 is located at the greatest radial point away from the central axis A. This facilitates refilling of the article 30, and in particular the venting of air from the article 30 during refilling, when the article is refilled with the axis A aligned in a horizontal direction (parallel with the x-axis in FIG. 4) as is described in more detail below. Alternatively, the refilling orifice 34 may be located at the second end 320 of the article 30, such that refilling orifice 34 is located at the greatest point or distance away from the first end 310 of the article 30 in the axis extending between the first end 310 and the second end 320.

In a similar fashion to the article illustrated in FIG. 2, aerosol-generating material 32 can then be inserted into the aerosol-generating material storage area 39 of the article 30 illustrated in FIG. 4 via the refilling orifice 34 and refilling tube 33. As described above, the refilling orifice 34 and/or the refilling tube 33 may be sealable, for example with a cap, one-way valve or septum valve. In other words, the refilling orifice 34 can comprise a cap, one-way valve or septum valve.

As illustrated in FIG. 4, the mouthpiece 35 is located at the second end 320. In other words, the mouthpiece 35 is opposite the interface 22 with the aerosol provision device 20. The mouthpiece 35 may be an integral part of the article 30 or alternatively the mouthpiece 35 may be separate component. In the latter case, the second end 320 of the article 30 is configured to receive the mouthpiece 35, such that the mouthpiece 35 can be attached to the article 30 when the article 30 is to be used as part of an aerosol provision system 10, and the mouthpiece 35 can be detached or otherwise removed from the article 30 before the article 30 is received by the article interface 42 of the refilling device 40.

FIGS. 5A and 5B are schematic diagrams of a refilling device 40 for an article of an aerosol provision system, such as the article 30 illustrated in FIG. 2 or FIG. 4, and the reservoir 50 illustrated in FIG. 3 or FIGS. 7A and 7B. The same reference signs have been used for like elements between the refilling device 40 illustrated in FIG. 3 and the refilling device 40 illustrated in FIGS. 5A and 5B. Like the refilling device 40 illustrated in FIG. 3, the refilling device 40 illustrated in FIGS. 5A and 5B comprises an article interface 42 configured to receive the article 30, a reservoir interface 46 configured to receive a reservoir 50, a duct 43 connecting a refilling inlet 45 to a refilling outlet 44, and refilling control circuitry 48 configured to control the operation of the refilling device 40.

Like the refilling device 40 illustrated in FIG. 3, the refilling device 40 illustrated in FIGS. 5A and 5B facilitates the transfer of the aerosol-generating material 52 from a reservoir 50 to the article 30 in order to refill or replenish the aerosol-generating material storage area 39 of the article 30 with aerosol-generating material. In other words, the refilling device 40 is a refilling apparatus for an article 30 of an aerosol provision system 10.

The refilling device 40 illustrated in FIGS. 5A and 5B can also be considered a desktop refilling device 40. As described above, a desktop refilling device is a refilling device designed for regular use at a single location on or near a desk, table or other solid surface due to its size and power requirements. For example, desktop refilling device 40 can comprise an external power supply, such as a mains power or supply to which the refilling device 40 can be coupled, attached or otherwise connected. The refilling device 40 may also comprise an internal power source, such as a battery, configured to supply electrical power to the components of the refilling device 40 in the event that the external power supply is not available or unexpectedly cuts out in the middle of operation. Additionally, the desktop refilling device may have one or more sides with a length of at least 100 mm, such 200 or 500 mm.

Like the refilling device 40 illustrated in FIG. 3, the refilling device 40 illustrated in FIGS. 5A and 5B comprises a flat surface 410 to facilitate storage of the desktop refilling device 40 on another flat surface, such as a desk, table or other solid surface. This allows the desktop refilling device 40 to rest stably and level on another surface. The flat surface 410 may comprise a non-slip mat or coating in order to prevent the desktop refilling device from being knocked or pushed. The non-slip mat may be made of rubber or any other suitable material with a high coefficient of friction. More generally, the desktop refilling device 40 illustrated in FIGS. 5A and 5B has the flat surface 410 at a first end of the refilling device 40 and a second surface 420 at a second end of the refilling device 40. The second end is opposite the first end, such that a major axis or length of the refilling device 40 extends between the first end and the second end. When the first end and flat surface 410 are placed or otherwise located on a horizontal surface (e.g. aligned with x-axis in FIGS. 5A and 5B), the major axis or length of the refilling device 40 extends in a vertical direction (aligned with the y-axis in FIGS. 5A and 5B) between the first end and the second end. The flat surface 410 can therefore be considered as the base, bottom or foot of the refilling device 40. The refilling device 40 may comprise a plurality of flat surfaces, for example one at each of four corners of the refilling device 40 such that the plurality of flat surfaces form feet or legs to support the refilling device 40 on another flat surface.

Figure 5A:
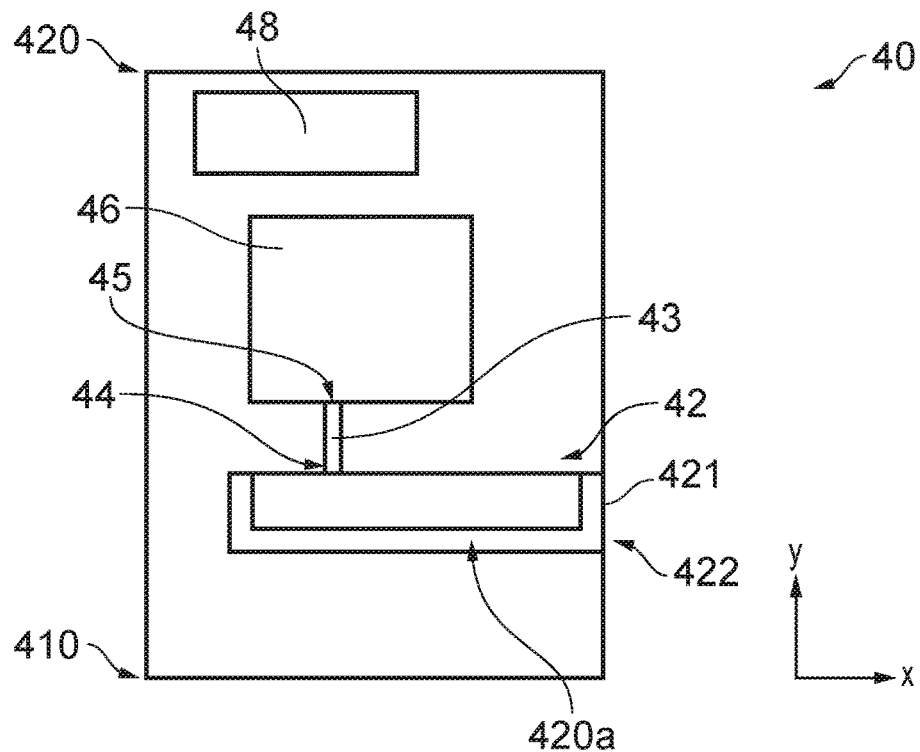
FIGS. 5A and 5B are schematic diagrams of an example refilling device for an article of an aerosol provision system.
Figure 5B:
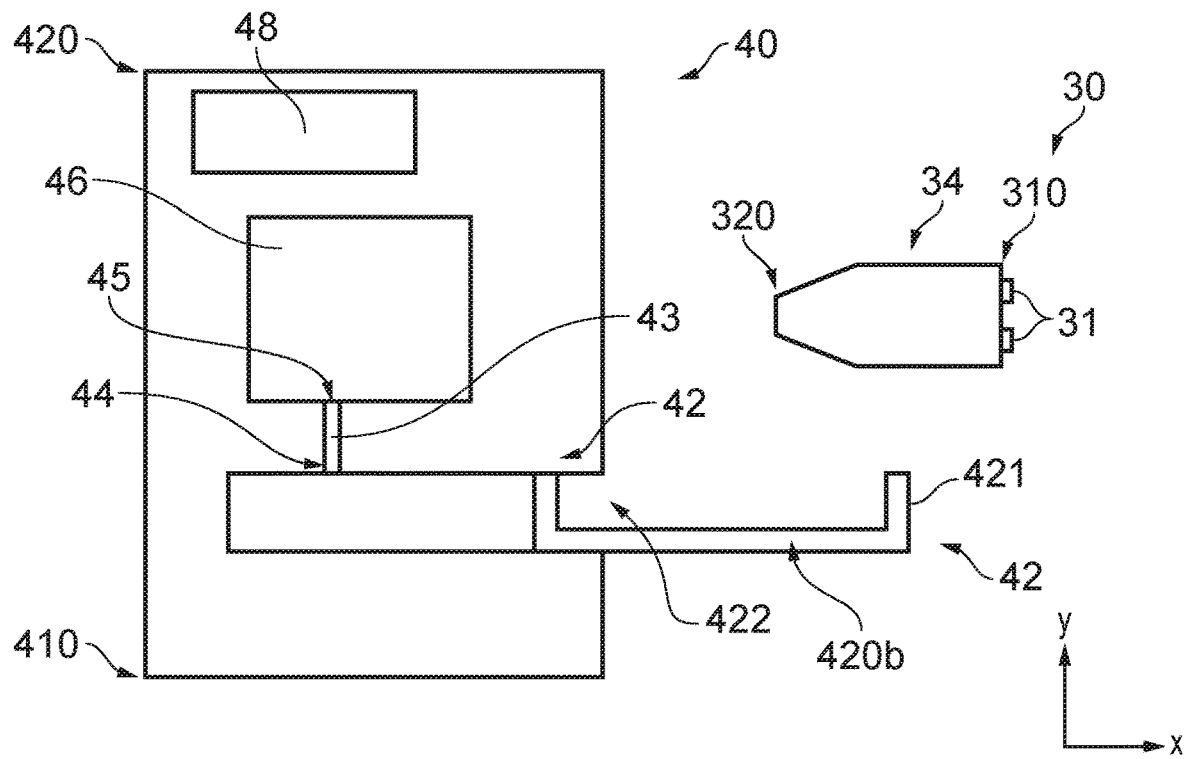

As illustrated in FIGS. 5A and 5B, the reservoir interface 46 is located above the article interface 42. In other words the reservoir interface 46 is located at a higher position than the article interface 42 such that, in use, the transfer of aerosol-generating material 52 from the reservoir 50 to the article 30 is gravity assisted, thereby reducing the energy required to transfer aerosol-generating material 52. The x-axis shown in FIGS. 5A and 5B aligns with a horizontal direction and the y-axis shown in FIGS. 5A and 5B aligns with a vertical direction. A first end of the refilling device 40 comprises the flat surface 410 to allow the refilling device 40 to be located on a horizontal surface. As illustrated in FIGS. 5A and 5B, the reservoir interface 46 is located further (in other words, a greater distance along the major axis or length of the refilling device 40) from the flat surface 410 than the article interface 42. This ensures that, when the flat surface 410 is placed on another flat surface (such as a horizontal surface), such as in the case of a desktop refilling device as described above, the flat surface 410 aligns with the x-axis (or horizontal direction), and the reservoir interface 46 is located at a higher position than the article interface 42.

As illustrated in FIGS. 5A and 5B, the article interface 42 is configured to receive the article 30 when the article 30 is separated from the aerosol provision device 20. As set out above with reference to FIG. 1, when used as an aerosol provision system 10, the aerosol provision device 20 and article 30 are mechanically coupled together via interfaces 22, 24. The article interface 42 is configured such that, before the article 30 is received by the article interface 42, the article is detached, disconnected or otherwise separated from the aerosol provision device 20 such that only the article 30 is received by the article interface 42 (in other words, the aerosol provision system 20 is not received by the article interface 42). This means that the aerosol provision device 20 is not required in order for the article 30 to be refilled with aerosol generating material 32.

The article interface 42 illustrated in FIGS. 5A and 5B comprises a holder 420. The holder 420 is configured to slide between a closed configuration 420a and an open configuration 420b. The housing 400 of the refilling device 40 comprises an article opening 422, and the holder is configured to slide into and out of the article opening 422. The holder 420 and a portion of the refilling device 40 may comprise rails and corresponding grooves to allow the holder 420 to side in a planar fashion (e.g. along the x-axis as illustrated in FIGS. 5A and 5B). In other words, the holder 420 is configured to slide in a horizontal direction when the refilling device 40 is located on a horizontal surface (i.e. when the first end and flat surface 410 are placed or otherwise located on a horizontal surface aligned with x-axis in FIGS. 5A and 5B).

FIG. 5A illustrates the holder 420 in the closed configuration 420a. When the holder 420 in a closed configuration 420a, the holder 420 is located substantially within the housing 400 of the refilling device 40. In other words, the holder 420 is contained within and/or enclosed by the housing 400 of the refilling device 40 such that the article interface 42 is configured to enclose the article 30 inside the housing 400 of the refilling device 40 when the holder 420 in a closed configuration 420a. The refilling control circuitry 48 is then configured to facilitate the transfer of aerosol-generating material 52 from the reservoir 50 to the article 30 when the holder 420 is in the closed configuration 420a. In other words, the holder 420 is configured to support the article during the transfer of aerosol-generating material 52 from the reservoir 50 to the article 30.

The refilling control circuitry 48 may be configured to detect, for example using a sensor or contact electrode, when the holder 420 is in the closed configuration 420a, and to facilitate the transfer of aerosol-generating material 52 from the reservoir 50 to the article 30 in response to detected that the holder 420 is in the closed configuration 420a. Alternatively, the refilling control circuitry 48 may detect that the holder 420 is in the closed configuration 420a, but only facilitate the transfer of aerosol-generating material 52 from the reservoir 50 to the article 30 in response to an input by a user of the refilling device 40, for example via an input means such as a button, touch screen or switch. Transferring aerosol-generating material 52 from the reservoir 50 to the article 30 when the holder 420 is in the closed configuration 420a ensures that the article interface 42 encloses the article 30 inside the housing 400 of the refilling device 40 during the transfer of aerosol-generating material 52 from the reservoir 50 to the article 30. This prevents the user from touching, interfering with or removing the article 30 during the transfer of aerosol-generating material 52, thereby improving the safety of the transfer and refilling process.

As described above, the housing 400 of the refilling device 40 comprises an article opening 422. An outer surface 421 of the holder 420 closes the article opening 422 such that the outer surface 421 of the holder 420 lies flush with the housing 400 when the holder 420 is in the closed configuration 420a. The outer surface 421 of the holder 420 therefore substantially confirms to the shape of the housing 400, thereby forming a portion of the housing 400.

FIG. 5B illustrates the holder 420 in the open configuration 420b. In the open configuration, the holder 420 is at least partially located outside the housing 400 of the refilling device 40. In other words, at least a portion of the holder 420 is not enclosed or contained within the housing 400 when the holder 420 is in the open configuration 420b. As illustrated in FIG. 8B, the outer surface 421 of the holder 420 is displaced away from the housing 400 along the x-axis, such that the outer surface 421 is not flush with the housing 400 when the holder 420 is in the open configuration 420b. Accordingly, the article opening 422 is not closed by the outer surface 421 in the open configuration 420b, and the article opening 422 provides a gap or hole in the housing 400 of the refilling device 40 through which the holder 420 can slide.

The holder 420 is configured to receive the article 30 when the holder 420 is in the open configuration 420b. In other words, since the holder 420 is at least partially located outside the housing 400 of the refilling device 40 in the open configuration 420b, the user is able to place, position or otherwise couple the article 30 in the holder 420 when the holder 420 is in the open configuration 420b such that the article 30 is received by the holder 420 of the article interface 42. When the holder 420 slides between the open configuration 420b and the closed configuration 420a, the holder 420 also transports the article 30; in other words, the article 30 slides into and out of the article opening 422 along with the holder 420.

The holder illustrated in FIG. 5B is a tray 420 configured to receive the article 30 from above such that the article 30 rests on the tray 420 when the refilling device 40 is located on a horizontal surface. As described above, the refilling device 40 has a flat surface 410 to facilitate storage of the refilling device 40 on another flat surface. As illustrated in FIG. 5B, the flat surface 410 can be aligned such that the flat surface is substantially horizontal (along the x-axis in Figure The tray 420 is then configured to receive the article 30 downwards in a vertical direction (in other words, a direction perpendicular to the flat surface 410, in the negative y-direction in Figure The article 30 is therefore lowered from above onto the tray 420 such that the article 30 rests on the tray in a horizontal orientation. In other words, the holder/tray 420 is configured to receive the article 30 in a horizontal orientation (along the x-axis in FIG. 5B) when the refilling device is located on a horizontal surface (i.e. when the flat surface 410 is aligned such that the flat surface 410 is substantially horizontal). The article 30 is therefore received in substantially the same orientation as the flat surface 410 (i.e. in the plane of the flat surface 410).

The tray 420 can comprise a trough with a size and shape substantially conforming to a perimeter size and shape of the article 30. In other words, the trough is a cut-out which mirrors the size and shape of the article 30 such that the article 30 is securely retained in the tray 420 on each side of the article 30 by the trough, for example by a location fit, similar fit, or press fit. This ensures that the article 30 does not move or roll as the holder 420 moves between the open configuration 420b and the closed configuration 420a. The trough is also positioned within the tray to ensure that the refilling orifice 34 on the article 30 is located proximate to the refilling outlet 44 when the holder 420 is in the closed configuration 420a. In other words, the trough ensures that the refilling orifice 34 of the article 30 is correctly located proximate to the refilling outlet 44 when the holder 420 is in the closed configuration 420a in order to facilitate the transfer of aerosol generating material into the article 30.

As can be seen by comparing the axes in FIGS. 4 and 5B, the article 30 is received by the holder 420 in a horizontal orientation such at that the elongate length extending centrally through the article 30 between the first end 310 and the second end 320 (along the axis A in FIG. 4) aligns with a horizontal direction (parallel with the x-axis) when the article 30 rests on or in the holder 420 and the refilling device 40 is located on a horizontal surface (i.e. when the flat surface 410 is aligned such that the flat surface 410 is substantially horizontal). As described above with reference to FIG. 4, this results in the refilling orifice 34 being located at the highest point on the article 30 since the refilling orifice 34 is located on the sidewall 330 at a distance furthest from the central axis A. In other words, the refilling orifice 34 is the point on the article 30 which is the furthest distance from the flat surface 410 when the article 30 rests on or in the holder 420 (i.e. when the article 30 is received by the holder 420). This facilitates refilling of the article 30, and in particular the venting of air from the article 30 during refilling, since the refilling orifice 34 is located at the highest point on the article 30, resulting in air in the article 30 being displaced upwards (along the y-axis) to the refilling orifice 34 during the transfer of aerosol-generating material 52 from the reservoir 50 to the article 30.

Although not illustrated, the holder 420 may comprise one or more connectors 41, such as contact electrodes, connected via electrical wiring to the refilling control circuitry 48 to facilitate communication between the refilling control circuitry 48 and the article control circuitry 38; the connectors 31 on the article 30 mate with the connectors 41 on the holder 420 when the article 30 is received by the holder 420, thereby allowing power to be supplied from the refilling device 40 to the article control circuitry 38 and electrical signals to be transferred between the refilling control circuitry 48 and the article control circuitry 38. The connectors 41 may be arranged relative to the holder 420, for example in the tray and/or trough, in a pattern and position matching/mirroring the connectors 31 on the article 30 in order to facilitate the mating of the connectors 31 on the article 30 and the connectors 41 on the holder 420 when the article 30 is received by the holder 420.

Although not illustrated, a motor may be connected to the holder 420, with the refilling control circuitry 48 configured to operate the motor to slide the holder 420 between the open configuration 420b and the closed configuration 420a. Alternatively, the holder 420 may comprise a biasing means, such as a spring, configured to bias the holder 420 towards the open location 420b. A force then needs to be applied on the holder 420 to overcome the biasing means and slide the holder 420 to the closed configuration 420a. In this case, there may be a latch, clip or other retaining mechanism to hold the holder 420 in the closed configuration 420a.

The refilling control circuitry 48 can be configured to operate the motor to slide the holder 420 into the closed configuration 420a in response to the article 30 being received by the holder 420. For example, the refilling control circuitry 48 may be configured to detect, for example using a sensor or contact electrode such as a connection between the connectors 31, 41, when the article 30 has been received by the holder 420, and to operate the motor to slide the holder 420 into the closed configuration 420a in response to detecting that the article 30 has been received by the holder 420. Alternatively, the refilling control circuitry 48 may detect that the article 30 has been received by the holder 420, but operate the motor in response to an input by a user of the refilling device 40, for example via an input means such as a button, touch screen or switch. The refilling control circuitry 48 may be configured to provide a prompt to the user, for example by illuminating an indicator light, displaying a notification on a display screen or playing a sound, to provide the input on the input means.

Equally, the refilling control circuitry 48 can be configured to operate the motor to slide the holder 420 to the open configuration 420b in response to the transfer of aerosol-generating material 52 from the reservoir 50 to the article 30. The refilling control circuitry 48 may be configured to detect that the transfer of aerosol-generating material 52 from the reservoir 50 to the article 30 is complete and to operate the motor in response to detecting that the transfer of aerosol-generating material 52 is complete. Alternative, as described above, the refilling control circuitry 48 may detect that the transfer of aerosol-generating material 52 from the reservoir 50 to the article 30 is complete, but operate the motor in response to an input by a user of the refilling device 40, for example via an input means such as a button, touch screen or switch. The refilling control circuitry 48 may be configured to provide a prompt to the user, for example by illuminating an indicator light, displaying a notification on a display screen or playing a sound, to provide the input on the input means.

Where the device interface 49 comprises a biasing means, having placed the article 30 into the holder 420, the user can push the holder 420, for example on the outer surface 421, to overcome the biasing means and slide the holder 420 from the open configuration 420b to the closed configuration 420a, where the retaining mechanism retains the holder 420 in the closed configuration 420a. In response to detecting that the transfer of aerosol-generating material 52 from the reservoir 50 to the article 30 is complete, the refilling control circuitry 48 can be configured to release the retaining mechanism such that the biasing means slides the holder 420 from the closed configuration 420a to the open configuration 420b. Alternatively, the refilling control circuitry 48 may detect that the transfer of aerosol-generating material 52 from the reservoir 50 to the article 30 is complete, but release the retaining mechanism in response to an input by a user of the refilling device 40, for example via an input means such as a button, touch screen or switch. The refilling control circuitry 48 may be configured to provide a prompt to the user, for example by illuminating an indicator light, displaying a notification on a display screen or playing a sound, to provide the input on the input means. In response to the user providing an input on the input means, the refilling control circuitry 48 can be configured to release the retaining mechanism, such that the biasing means slides the holder 420 from the closed configuration 420a to the open configuration 420b. Alternatively, the input means can be mechanically connected to the retaining mechanism, such that the user input directly releases the retaining mechanism.

Figure 6A:
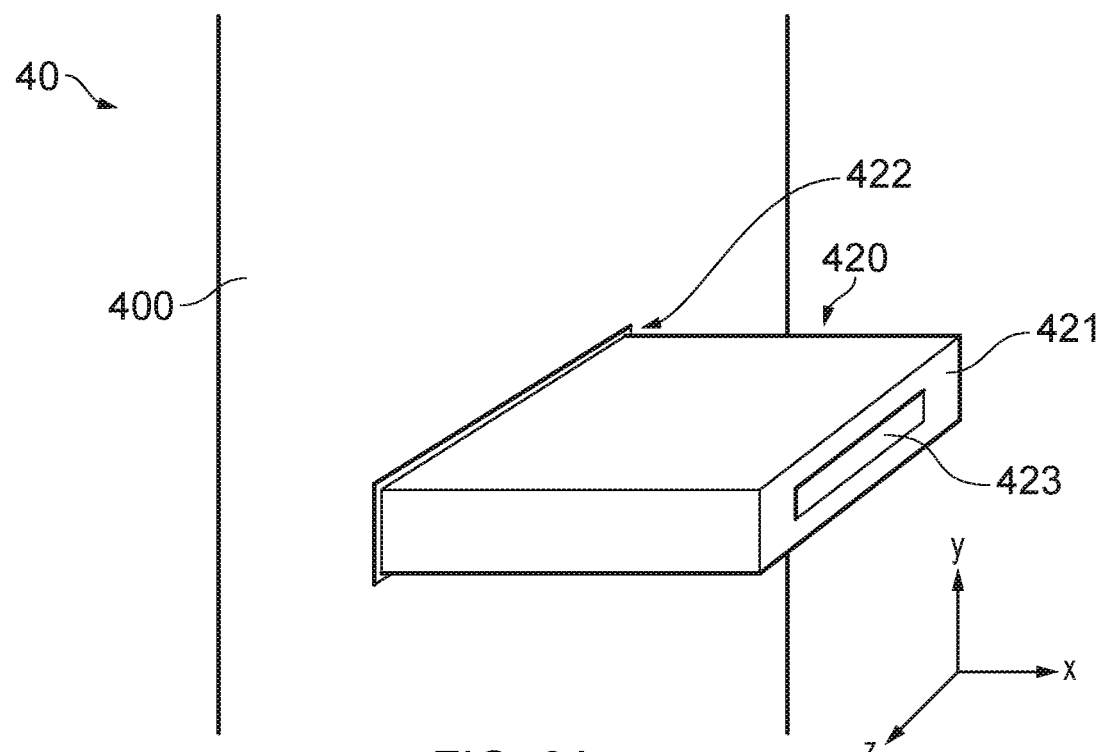
FIGS. 6A and 6B illustrate indicator light arrangements for the refilling device illustrated in FIGS. 5A and 5B.
Figure 6B:
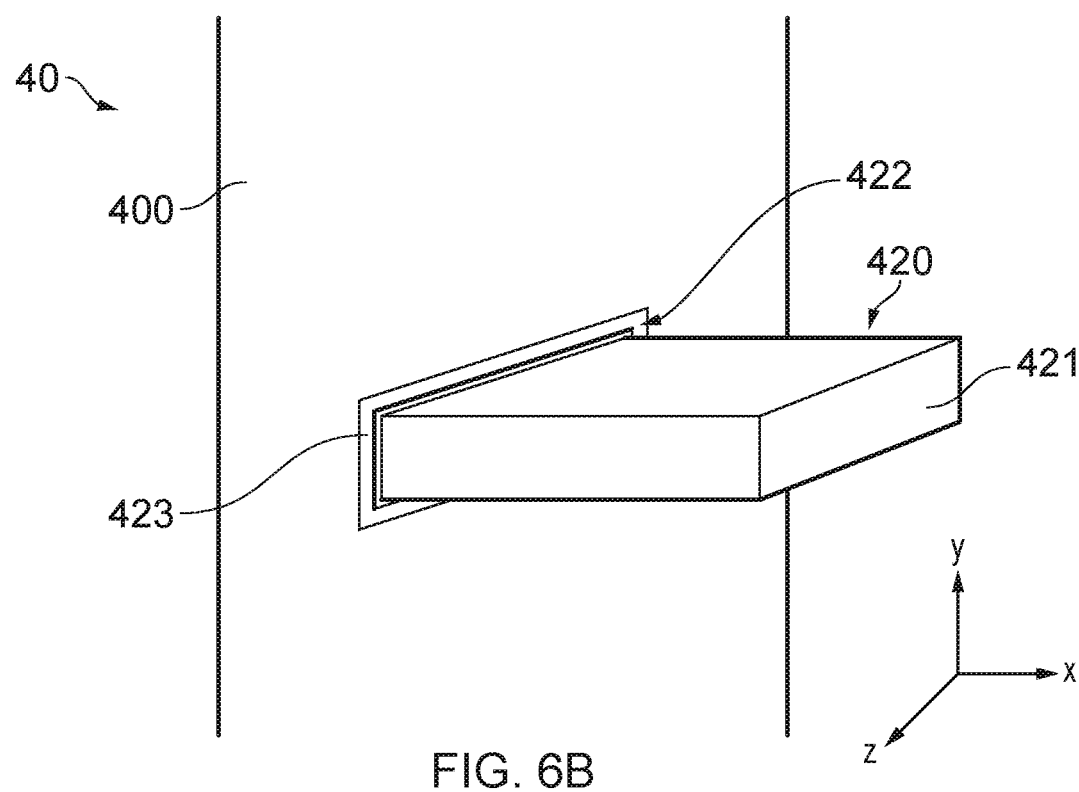

As described above, the refilling control circuitry 48 is further configured to operate an indicator light on the refilling device 40 based on the transfer of aerosol-generating material 52 from the reservoir 50 to the article 30. For example, the refilling control circuitry 48 can be configured to operate the indicator light to provide one or more of the prompts to user as described above, such as to notify the user that the article 30 has been received by the holder 420, the reservoir 50 has been received by the reservoir interface 46 and/or that the transfer of aerosol-generating material 52 from the reservoir 50 to the article 30 is beginning, in progress, and/or complete. FIGS. 6A and 6B illustrate indicator light arrangements for a refilling device 40, such as the refilling device 40 illustrated in FIGS. 5A and 5B.

The indicator light 423 illustrated in FIG. 6A is located on the article interface 42, in particular on the outer surface 421 of the holder 420 of the article interface 42. By locating the indicator light 423 on the outer surface 421, the indicator light 423 can be seen by the user when the holder 420 is in both the open configuration 420b and the closed configuration 420a. Although the indicator light 423 is illustrated in FIG. 6A as being a rectangle located in the middle of the outer surface 421, it will be appreciated that the indicator light 423 may to located anywhere on the outer surface 421 and be a size and shape such that the indicator light 423 provides one or more of the prompts to user as described above.

FIG. 6B illustrates an alternative arrangement of indicator light 423. The indicator light 423 in FIG. 6B is located on the housing 400 of the refilling device 40, in particular surrounding the article opening 422. In other words, the indicator light 423 extends around the perimeter of the article opening 422 such that the indicator light 423 can be seen by the user when the holder 420 is in both the open configuration 420b and the closed configuration 420a, since the indicator light 423 will extend around the perimeter of the article opening 422 adjacent to the outer surface 421 of the holder 420 when the holder 420 is in the closed configuration 420a. It will be appreciated, however, that the indicator light 423 may be located on another surface of the refilling device, such as the second surface 420. Locating the indicator light 423 on or proximate to the article interface 42 makes it clear to the user that the prompt or notification provided by the indicator light 423 relates to the transfer of aerosol-generating material 52 from the reservoir 50 to the article 30, and more specifically to the article interface 42 and/or the article 30.

Figure 7A:
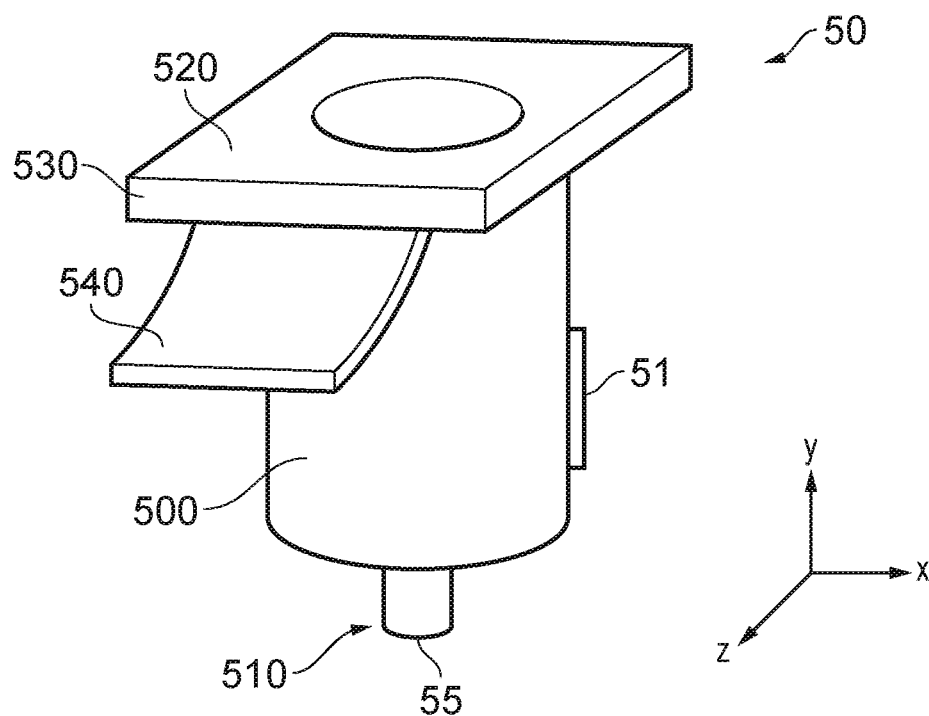
FIGS. 7A and 8A are schematic diagrams of example reservoirs for use with a refilling device.

FIGS. 7A and 8B are schematic diagrams of example reservoirs for use with a refilling device 40, such as the refilling device illustrated in FIGS. 5, 6, 8 and 9. As described above, the reservoir 50 comprises aerosol-generating material 52 (not illustrated) for transferring, by the refilling device 40, to the article 30 in order to refill or replenish the aerosol-generating material 32 in the aerosol-generating material storage area 39 of the article 30.

Figure 7B:
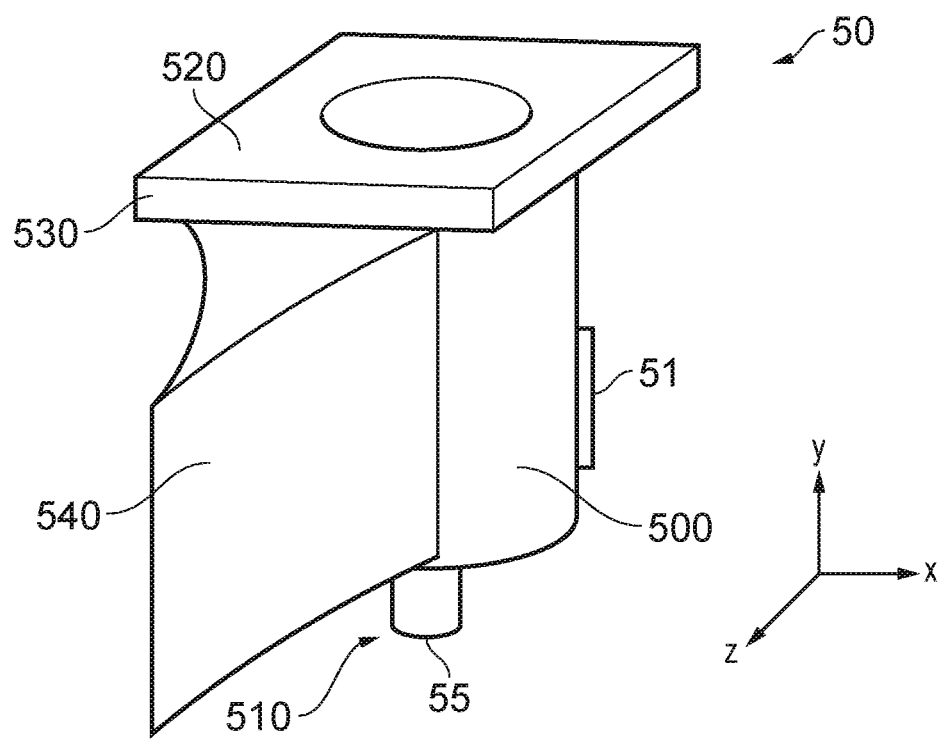

The reservoir 50 illustrated in FIGS. 7A and 7B comprises a first, or bottom, end 510 of the reservoir 50 and a second, or top, end 520 of the reservoir 50. The second end 520 is opposite the first end 510, such that a major axis or length of the reservoir 50 extends between the first end 510 and the second end 520.

The reservoir outlet 55 on the reservoir 50 illustrated in FIGS. 7A and 7B is located at the first end 510 of the reservoir 50. When the reservoir 50 is received by the refilling device 40, the reservoir is oriented such that the reservoir outlet 55 is located at the bottom or lowest point on the reservoir 50, thereby allowing the transfer of aerosol generating material 52 from the reservoir 50 to be assisted by gravity.

The reservoir 50 illustrated in FIGS. 7A and 7B comprises a flange 530 at the top or second end 520 of the reservoir 50. In other words, the flange 530 is on the opposite side of the reservoir 50 to the reservoir outlet 55. The flange 530 is surface that extrudes outwards from the main body or casing 500 of the reservoir 50, providing a means of connecting the reservoir 50 to the refilling device 40 as described in more detail below with respect to FIGS. 8A and 8B.

The reservoir 50 illustrated in FIGS. 7A and 7B also comprises a hold 540 to allow the user to easily grip and hold the reservoir 50. As illustrated in FIGS. 7A and 7B, the hold 540 is located on a sidewall of the reservoir 50 between the first end 510 and the second end 520. In FIG. 7A, the hold comprises a flexible tab 540. The tab 540 is configured to lie flush against the body 500 of the reservoir 50 (in other words, against the sidewall of the reservoir 50) when the tab is not being used by the user to hold the reservoir 50. This reduces the volume of the reservoir 50 when the tab 540 is not being used. In FIG. 7B, the hold comprises an integral finger which forms part of the body 500 of the reservoir 50, in particular the sidewall of the reservoir. This provides a solid, rigid surface for the user to hold.

The reservoir 50 also comprises (not illustrated) reservoir control circuitry 58 configured to control the reservoir 50 and store parameters and/or data associated with the reservoir 50. The parameters associated with the reservoir 50 may include, for example data indicative of an amount of aerosol-generating material 52 stored in the reservoir 50, data relating to the aerosol-generating material 52 stored in the reservoir 50, such as one or more ingredients, the concentration and/or amount of the ingredients and/or one or more flavorants within the aerosol-generating material 52. The data may also comprise an identifier, such as a serial number and/or SKU for the reservoir 50 or other means of identifying the reservoir 50 and/or the type of the reservoir 50, and a date of manufacture and/or expiry of the reservoir 50. As described above in relation to the device control circuitry 28, the reservoir control circuitry 58 can be provided in various different ways, for example using one or more suitably programmed programmable computer(s) and/or one or more suitably configured application-specific integrated circuit(s)/circuitry/chip(s)/chipset(s) configured to provide the desired functionality. For example, the reservoir control circuitry 58 may comprise a microcontroller unit (MCU) or a system on chip (SoC). Alternatively, the reservoir control circuitry 58 may comprise a code printed onto the reservoir, such as a barcode or QR code, or an NFC chip or other form of passive tag.

The reservoir 50 illustrated in FIGS. 7A and 7B also comprises one or more connectors 51 electrically coupled to the reservoir control circuitry 58. The connectors 51 are configured to mate with the connectors 47 on the reservoir interface 46 when the reservoir 50 is received by the refilling device 40, thereby allowing power to be supplied from the refilling device 40 to the reservoir control circuitry 58 and electrical signals to be transferred between the refilling control circuitry 48 and the reservoir control circuitry 58. As illustrated in FIGS. 7A and 7B, the connectors 51 are located on the opposite side of the reservoir 50 to the hold 540, between the first end 510 and the second end 520. In other words, the connectors 51 are on the side of the reservoir 50 corresponding to the negative z-direction in FIGS. 7A and 7B, whilst the hold 540 is located on the side of the reservoir 50 corresponding to the positive z-axis in FIGS. 7A and 7B. This allows the user to hold with reservoir 50 without touching or damaging the connector 51.

The reservoir 50 can have a volume of 10 ml or more, for example 20 ml, 50 ml or 100 ml. In other words, the reservoir is configured to contain 10 ml or more of aerosol-generating material 52 when the reservoir 50 is filled with aerosol generating material 52. The reservoir interface 46 of the refilling device 40 is then configured to receive a reservoir 50 with a volume of 10 ml or more.

The reservoir 50 can also have a larger volume than the article 30. For example, the volume of the reservoir can be at least 5 times greater than the volume of the article, for example 10 times, 20 times or 50 times greater. In other words, the reservoir is configured to contain, when filled with aerosol-generating material 52, a volume of aerosol-generating material 52 at least 5 times greater than the aerosol-generating material storage area 39 of the article 30. This allows the same reservoir 50 to be used to refill the article at least 5 times. The reservoir interface 46 of the refilling device 40 is then configured to receive a reservoir 50 with a volume at least 5 times greater than a volume of the article the article interface 42 of the refilling device 40 is configured to receive.

Although not illustrated, the reservoir 50 may also comprise a window on a sidewall of the reservoir 50 to allow the user to see the amount of aerosol-generating material 52 contained in the reservoir 50. Alternatively, a portion of a sidewall of the reservoir 50 may be transparent to allow the user to see through the sidewall to see the amount of aerosol-generating material 52 contained in the reservoir 50.

Figure 8A:
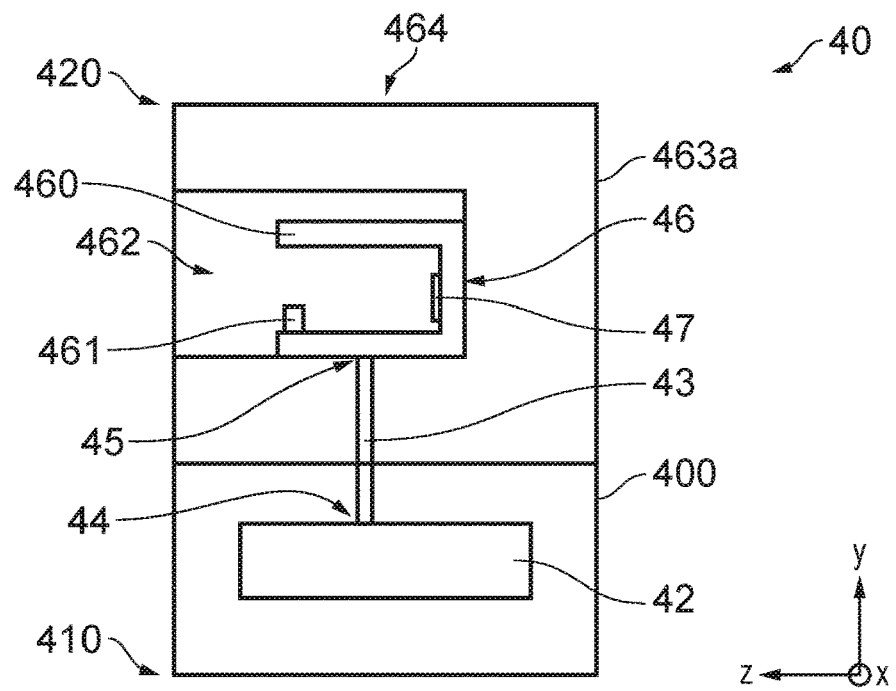
Figure 8B:
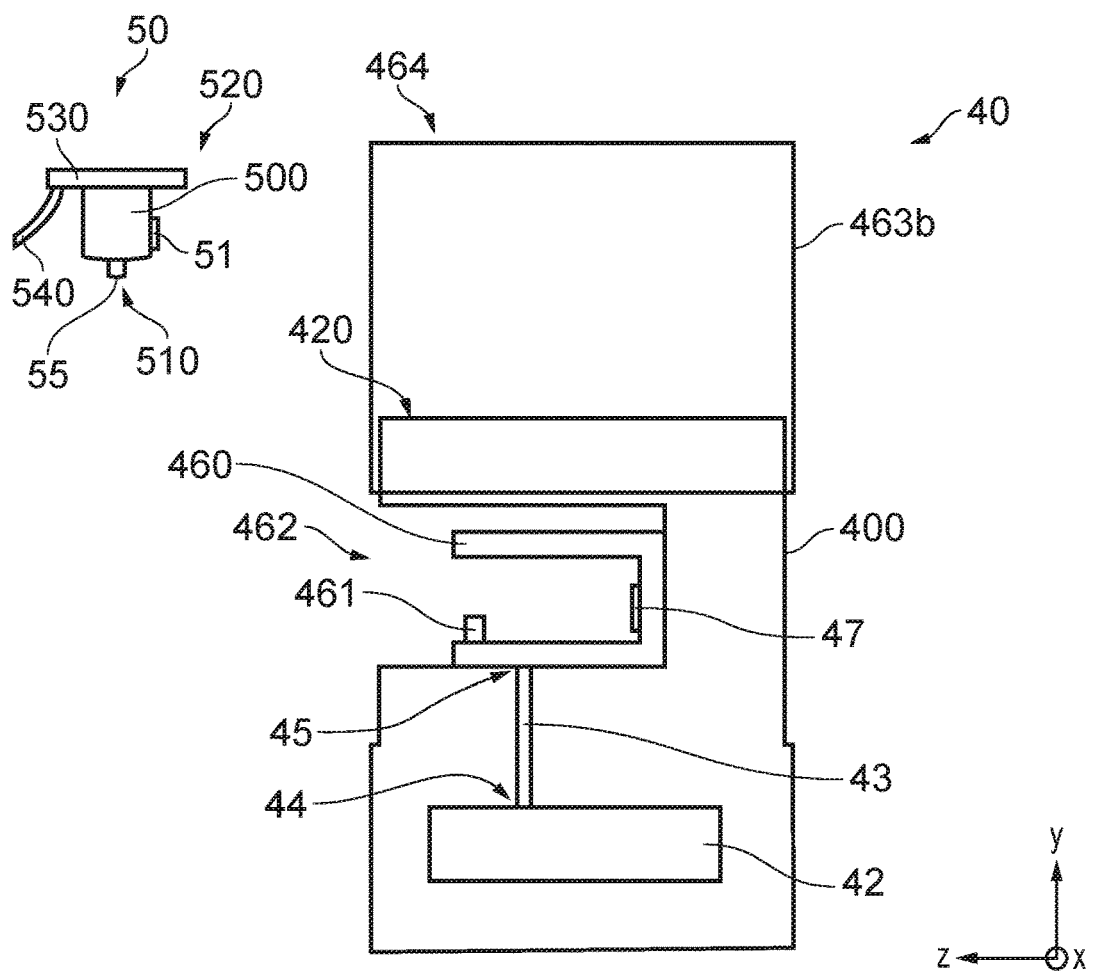

FIGS. 8A and 8B are further schematic diagrams of the refilling device 40 illustrated in Figured 5A and 5B, such that the features and operation of the refilling device 40 described above with reference to FIGS. 5 to 6, in particular the article interface 42, are also present but not necessarily illustrated in the refilling device 40 illustrated in FIGS. 8A and 8B. The same reference signs have been used for like elements between the refilling device 40 illustrated in FIGS. 5 and 6 and the refilling device 40 illustrated in FIGS. 8A and 8B.

As illustrated in FIGS. 8A and 8B, the reservoir interface 46 is located on a different side of the refilling device 40 to the article interface 42. The article interface 42 (as described above with reference to FIGS. 5A and 5B) is on a side of the refilling device 40 corresponding to the positive x-direction in FIGS. 8A and 8B, whilst the reservoir interface 46 is located on a side of the refilling device 40 corresponding to the positive z-direction in FIGS. 8A and 8B. In other words, the reservoir interface 46 and the article interface 42 are orthogonal to each other. Alternatively, the reservoir interface 46 and the article interface 42 could be opposite each other on the refilling device 40. For example, the article interface 42 could be on a side of the refilling device 40 corresponding to the negative z-direction in FIGS. 8A and 8B, whilst the reservoir interface 46 is located on a side of the refilling device 40 corresponding to the positive z-direction in FIGS. 8A and 8B.

As described above with reference to FIGS. 5A and 5B, the reservoir interface 46 illustrated in FIGS. 8A and 8B is located above the article interface 42. The reservoir interface 46 illustrated in FIGS. 8A and 8B comprises a holder 460 configured to receive the reservoir 50. The holder 460 is a size and shape that corresponds to the size, depth and shape of at least a portion of the reservoir 50 such that at least a portion of the reservoir 50 can be inserted into the holder 460 in order for the reservoir 50 to be received by the reservoir interface 46. For example, the reservoirs illustrated in FIGS. 7A and 7B comprises a flange 530 at a top or second end 520 of the reservoir 50. In this case, the holder 460 can comprise rails or other guides to receive the flange 530 of the reservoir 50. In other words, the flange 530 of the reservoir can be slid onto or into rails on the holder 460 so that the flange 530 of the reservoir 50 rests in or on the holder 460 when the reservoir 50 is received by the holder 460.

The reservoir interface 46 illustrated in FIGS. 8A and 8B also comprises a retaining mechanism 461 configured to retain the reservoir 50 in the holder 460. The retaining mechanism 461 may be a latch, clip, spring clip, or other retaining means suitable to hold and retain the reservoir 50 in the holder 460. The retaining mechanism 461 is illustrated in FIGS. 8A and 8B as being located on the holder 460, but it will be appreciated that the retaining mechanism 461 can be located anywhere on the reservoir interface 46 in order to retain and hold the reservoir 50 in the holder 460.

The holder 460 illustrated in FIGS. 8A and 8B comprises one or more connectors 47, such as contact electrodes, connected via electrical wiring to the refilling control circuitry 48 to facilitate communication between the refilling control circuitry 48 and the reservoir control circuitry 58; the connectors 51 on the reservoir 50 mate with the connectors 47 on the holder 460 when the reservoir 50 is received by the holder 460, thereby allowing power to be supplied from the refilling device 40 to the reservoir control circuitry 58 and electrical signals to be transferred between the refilling control circuitry 48 and the reservoir control circuitry 58. The connectors 47 may be arranged relative to the holder 460 in a pattern and position matching/mirroring the connectors 51 on the reservoir 50 in order to facilitate the mating of the connectors 51 on the reservoir 50 and the connectors 47 on the holder 460 when the reservoir 50 is received by the holder 460. Alternatively the connectors 47 may be located elsewhere on the reservoir interface 46 provided that the connectors 51 on the reservoir 50 mate with the connectors 47 when the reservoir 50 is received by the holder 460.

The holder 460 is also configured such that the reservoir outlet 55 on the reservoir 50 is located proximate to the refilling inlet 45 when the reservoir 50 is received by the holder 460. This allows the refilling inlet 45 to mate with a reservoir outlet 55 during the transfer of aerosol-generating material 52 from the reservoir 50 to the article 30. In other words, the holder 460 is a size and shape such when the reservoir 50 is located in the holder 460 and retained by the retaining mechanism 461, the reservoir outlet 55 on the reservoir 50 is located proximate to the refilling inlet 45.

The holder 460 may be a size and shape such that the reservoir 50 can only be received by the holder 460 in one orientation, such that reservoir outlet 55 on the reservoir 50 is located proximate to the refilling inlet 45 and the connectors 51 on the reservoir 50 mate with the connectors 47 on the holder 460 when the reservoir 50 is received by the holder 460 (i.e. the reservoir 50 is located in the holder 460 and retained by the retaining mechanism 461).

The holder 460 is configured to receive the reservoir 50 in a horizontal direction (along the x-axis in FIG. 5B) when the refilling device 40 is located on a horizontal surface (i.e. when the flat surface 410 is aligned such that the flat surface 410 is substantially horizontal). As will be appreciated by comparing FIGS. 7A and 7B with FIGS. 8A and 8B, the holder 460 is configured to receive the reservoir 50 such that the reservoir outlet 55 is located at the lowest point of the reservoir 50. In other words, when the reservoir 50 is received by the holder 460, the reservoir outlet 55 is the closest point on the reservoir 50 to the flat surface 410 of the refilling device. As described above, this allows the transfer of aerosol generating material 52 from the reservoir 50 to be assisted by gravity.

The reservoir interface 46 illustrated in FIGS. 8A and 8B is located within a reservoir opening 462 in the housing 400 of the refilling device 40. In other words, the reservoir interface 46 is contained within and/or enclosed by the housing 400 of the refilling device 40 such that the reservoir interface 46 is configured enclose the reservoir 50 inside the housing 400 of the refilling device 40 during the transfer of aerosol-generating material 52 from the reservoir 50 to the article 30.

The housing 400 illustrated in FIGS. 8A and 8B comprises an access panel 463. The access panel 463 is configured to move between an open configuration 463b and a closed configuration 463a.

FIG. 8A illustrates the access panel 463 in the closed configuration 463a. When the access panel 463 in the closed configuration 463a, the reservoir opening 462 is sealed by the access panel 463. In other words, when the access panel 463 is in the closed configuration 463a, the reservoir interface 46 is enclosed and sealed within the housing 400 such that the reservoir cannot be removed or inserted into the reservoir interface 46. The refilling control circuitry 48 is then configured to facilitate the transfer of aerosol-generating material 52 from the reservoir 50 to the article 30 with the access panel 463 is in the closed configuration 463a. As illustrated in FIG. 8A, an outer surface 464 of the access panel 463 is flush with or proximate to the second or top surface 420 of the housing 400 when the access panel 463 in the closed configuration 463a, such that the access panel 463 substantially confirms to the shape of the housing 400, thereby forming a portion of the housing 400.

The refilling control circuitry 48 may be configured to detect, for example using a sensor or contact electrode, when the access panel 463 is in the closed configuration 463a, and to facilitate the transfer of aerosol-generating material 52 from the reservoir 50 to the article 30 in response to detecting that the access panel 463 is in the closed configuration 463a. Alternatively, the refilling control circuitry 48 may detect that the access panel 463 is in the closed configuration 463a, but only facilitate the transfer of aerosol-generating material 52 from the reservoir 50 to the article 30 to an input by a user of the refilling device 40, for example via an input means such as a button, touch screen or switch. Transferring aerosol-generating material 52 from the reservoir to the article 30 when the access panel 463 is in the closed configuration 463a ensures that the reservoir interface 46 encloses the reservoir 50 inside the housing 400 of the refilling device during the transfer of aerosol-generating material 52 from the reservoir 50 to the article 30. This prevents the user from touching, interfering with or removing the reservoir 50 during the transfer of aerosol-generating material 52, thereby improving the safety of the transfer and refilling process.

FIG. 8B illustrates the access panel 463 in the open configuration 463b. In the open configuration, the access panel 463 does not seal or cover the reservoir opening 462. In other words, the housing 400 of the refilling device 40 does not fully enclose the reservoir interface 46. The reservoir opening 462 therefore provides a gap or hole in the housing 400 of the refilling device 40 through which the reservoir interface 46 can be accessed. Accordingly, the reservoir interface 46 is configured to receive the reservoir 50 when the access panel 463 is in the open configuration 463b.

As illustrated in FIG. 8B, the access panel 463 is displaced upwards along the y-axis (along the major axis of the refilling device 40), such that the outer surface 464 of the access panel 463 is not flush with or proximate to the second or top surface 420 of the housing 400 when the access panel 463 in the open configuration 463b. As described above with reference to FIGS. 5A and 5B, the holder 420 of the article interface 42 is configured to slide between an open configuration 420b and a closed configuration 420a. The holder 420 is configured to slide a horizontal direction aligned with the x-axis when the refilling device 40 is located on a horizontal surface (i.e. when the first end and flat surface 410 are placed or otherwise located on a horizontal surface aligned with x-axis in FIGS. 5A and 5B). As illustrated in FIGS. 8A and 8B, the access panel 463 moves between the open configuration 463b and the closed configuration 463a in a vertical direction aligned with the y-axis when the refilling device 40 is located on a horizontal surface (i.e. when the first end and flat surface 410 are placed or otherwise located on a horizontal surface aligned with x-axis in FIGS. 8A and 8B). Accordingly, the holder 420 slides in a direction perpendicular to the direction the access panel 463 moves between the open configuration 463a and the closed configuration 463b.

The access panel 463 illustrated in FIGS. 8A and 8B is a sliding panel that slides between the open configuration 463a and the closed configuration 463b. For example, the access panel 463 and a portion of the refilling device 40 may comprise rails and corresponding grooves to allow the access panel 463 to side in a planar fashion (e.g. along the y-axis as illustrated in FIGS. 8A and 8B).

The access panel 463 illustrated in FIGS. 8A and 8B extends around substantially part of or substantially all of the perimeter of the housing 400 of the refilling device 40. In other words, the access panel 463 is partial or complete tube that slides around and along the outside of the housing 400 of the refilling device 40. The access panel 463 may extend around half of the housing 400, 75% of the housing 400 or the entirety of the housing 400. It will be appreciated, however, that the access panel 463 may extend around any portion of the housing such that the access panel 463 seals the reservoir opening 462 when the access panel 463 is in the closed configuration 463a and access panel 463 opens or otherwise exposes the reservoir opening 462 when the access panel 463 is in the open configuration 463b.

The access panel 463 may comprise a window, for example at a location that is proximate to the reservoir opening 462 when the access panel 463 is in the closed configuration 463b. This allows the user to see through the access panel 463 and the reservoir opening 462 to observe the reservoir and the refilling process. Alternatively, a portion of the access panel 463 at a location that is proximate to the reservoir opening 462 when the access panel 463 is in the closed configuration 463b may be transparent to allow the user to see through the access panel 463 and the reservoir opening 462 to observe the reservoir and the refilling process.

As described above, the reservoir interface 46 is configured to receive the reservoir 50 when the access panel 463 is in the open configuration 463b. The reservoir 50 is received by the holder 460 and the retaining mechanism 461 retains the reservoir 50 in the holder 460. In order to remove the reservoir 50 from the reservoir interface 46, the user may be able to pull on a surface of the reservoir 50, such as the hold 540, in order to provide a force to overcome the retaining mechanism 461. For example, where the retaining mechanism 461 is a spring clip, pulling on the hold 540 of the reservoir 50 will provide sufficient force to overcome the retaining force of the spring clip and to remove the reservoir 50 from the reservoir interface 46.

Alternatively, the refilling control circuitry 48 is configured to release the retaining mechanism, for example in response to the transfer of aerosol-generating material 52 from the reservoir 50 to the article 30, or in response to a user input on an input means. Where the retaining mechanism 461 is a latch, the reservoir 50 may only be removable from the reservoir interface 46 in response to the latch being released, either by the refilling control circuitry 48 or through actuation by the user of a switch or button mechanical linked to the latch.

The holder 460 is configured to receive the reservoir 50 such that the hold 540 is located proximate and/or is the closest point on the reservoir to the reservoir opening 462, thereby allowing the user to grip and pull on the hold 540 in order to remove the reservoir 50 from the holder 460.

A motor may be connected to the access panel 463, with the refilling control circuitry 48 configured to operate the motor to move the access panel 463 between the open configuration 463b and the closed configuration 463a. Alternatively, the access panel 463 may comprise a biasing means, such as a spring, configured to bias the access panel 463 towards the open configuration 463b. A force then needs to be applied on the access panel 463 to overcome the biasing means and move the access panel 463 to the closed configuration 463a. In this case, there may be a latch, clip or other retaining means to hold the access panel 463 in the closed configuration 463a.

The access panel 463 may be configured to move between the open configuration 463b and the closed configuration 463a in response to an input on the refilling device 40 by a user of the refilling device 40. For example, where the access panel 463 comprises a motor, the refilling device 40 may comprise input means such as a button, touch screen or switch. In response to the user providing an input on the input means, the refilling control circuitry 48 can be configured to operate the motor to move the access panel 463 from the open configuration 463b to the closed configuration 463a. The refilling control circuitry 48 can be configured to operate the motor to move the access panel 463 from the closed configuration 463a to the open configuration 463b in response to a further input from the user, either on the input means via a different input means.

Where the access panel 463 comprises a biasing means, in response to the user providing an input on the input means, the refilling control circuitry 48 can be configured to release the retaining means, thereby allowing the biasing means to more the closed configuration 463a to the open configuration 463b. Alternatively, the input means can be mechanically connected to the retaining mechanism, such that the user input directly released the retaining means. The user can then push the access panel 463, for example on the outer surface 464, to overcome the biasing means and return the access panel 463 from the open configuration 463b to the closed configuration 463a, where the retaining means retains the access panel 463 in the closed configuration 463a.

In each case, the input means may be located on the housing 400 of the refilling device proximate to the access panel 463, or on a different location on the refilling device 40. Alternatively, the input means may be located on the access panel 463, such as on the outer surface 494 of the access panel 463 or a surface of the access panel 463 proximate to the reservoir opening when the access panel 463 is in the closed configuration 463a.

Figure 9A:
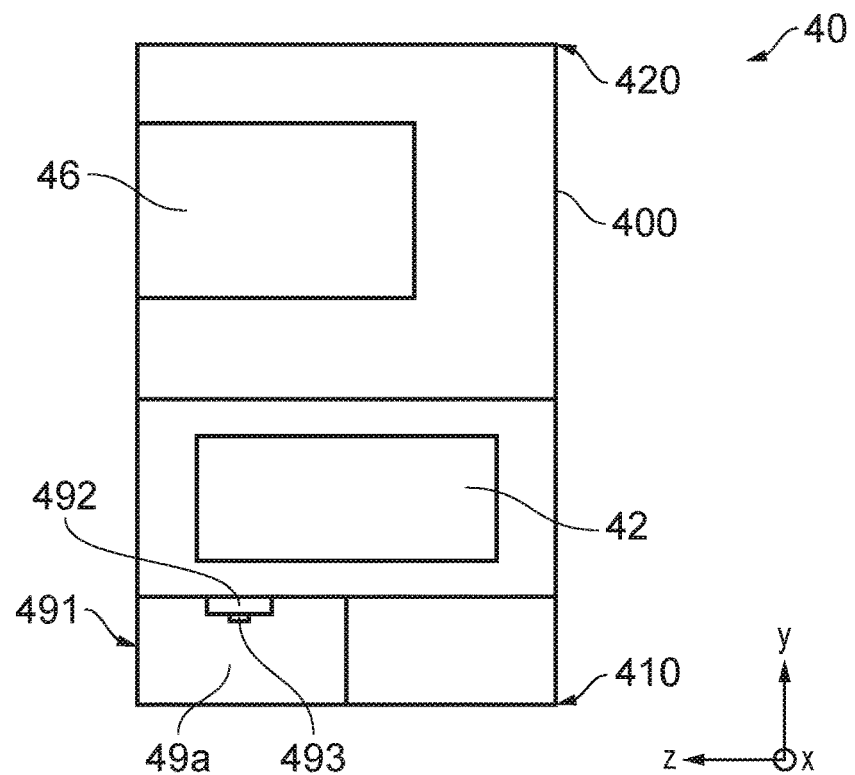
FIGS. 9A and 9B are schematic diagrams of a refilling device 40 for an article of an aerosol provision system.
Figure 9B:
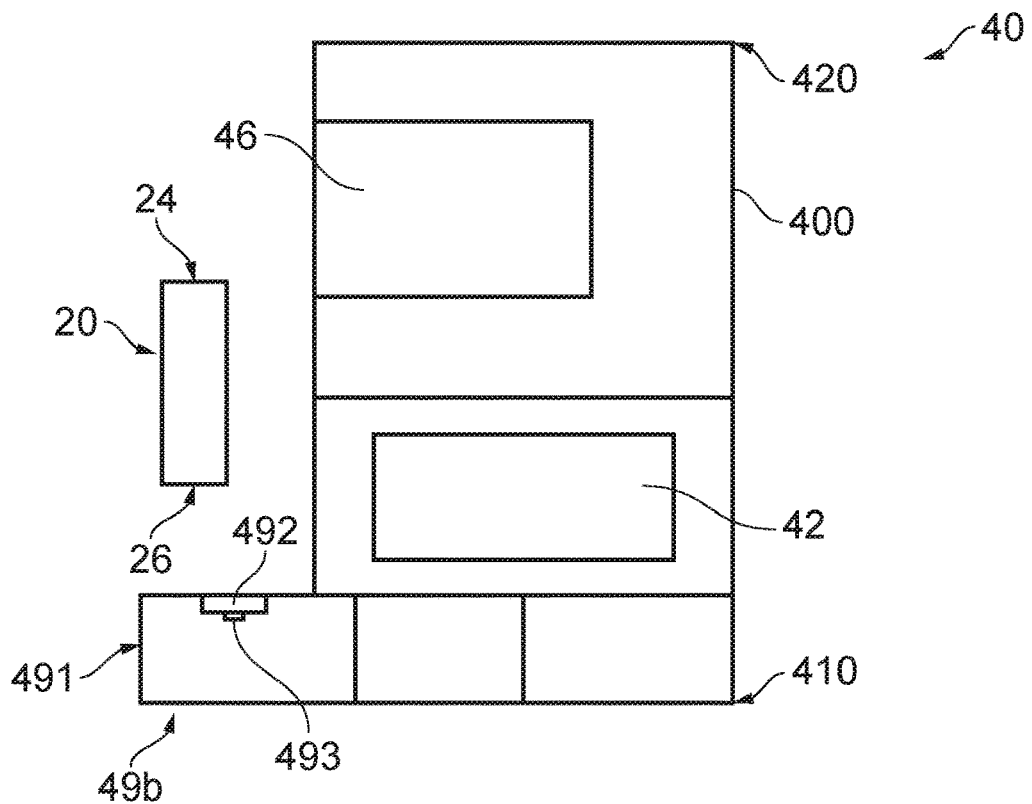

FIGS. 9A and 9B are schematic diagrams of a refilling device 40 for an article of an aerosol provision system, such as the article 30 illustrated in FIG. 2 or FIG. 4, and the reservoir 50 illustrated in FIG. 3 or FIGS. 7A and 7B.

The refilling device 40 illustrated in FIGS. 9A and 9B is substantially the same as the refilling device 40 illustrated in FIGS. 5, 6 and 8, such that the features and operation of the refilling device 40 described above with reference to FIGS. 5, 6 and 8 are also present, but not necessarily illustrated, in the refilling device 40 illustrated in FIGS. 9A and 9B. The same reference signs have been used for like elements between the refilling device 40 illustrated in FIGS. 5, 6 and 8 and the refilling device 40 illustrated in FIGS. 9A and 9B.

In addition to the features described above with reference to FIGS. 5 to 8, the refilling device 40 illustrated in FIGS. 9A and 9B includes a device interface 49. As described above with reference to FIG. 3, the device interface 49 configured to receive the aerosol provision device 20. Control circuitry, such as the refilling control circuitry 48 described above, is then configured to transfer electrical power to the aerosol provision device 20 for charging a power source 14 of the aerosol provision device 20. For example, the control circuitry 48 may be configured to charge a power source 14 of the aerosol provision device 20 in response to the aerosol provision device 20 being received by the device interface 49.

FIG. 9A illustrates the device interface 49 at a first location 49a. When the device interface 49 is at the first location 49a, the device interface 49 is located within the housing 400 of the refilling device 40. In other words, the device interface 49 is contained within and/or enclosed by the housing 400 of the refilling device 40 such that the aerosol provision device 20 cannot received by the article interface 49. This protects the components of the device interface 49 when the device interface 49 is not in use.

As illustrated in FIG. 9A, an outer surface 491 of the article interface 49 may lie flush with the housing 400 when the device interface 49 at a first location 49a such that the outer surface 491 of the article interface 49 substantially confirms to the shape of the housing 400, thereby forming a portion of the housing 400.

FIG. 9B illustrates the device interface 49 at a second location 49b. When the device interface 49 is at the second location 49a, the device interface 49 at least partially located outside the housing 400 of the refilling device 40. In other words, at least a portion of the device interface 49 is not enclosed or contained within the housing 400 when the device interface 49 is at the second location 49a. As illustrated in FIG. 9B, the outer surface 491 of the device interface 49 is displaced away from the housing 400 along the z-axis, such that the outer surface 491 is not flush with the housing 400 when the device interface 49 is at the second location 49a.

As illustrated in FIG. 9B, the device interface 49 is located on a different side of the refilling device to the article interface 42. The article interface 42 (as described above with reference to FIGS. 5A and 5B) is on a side of the refilling device 40 corresponding to the positive x-direction in FIG. 9B, whilst the device interface 49 is located on a side of the refilling device corresponding to the positive z-axis in FIG. 9B. In other words, the device interface 49 and the article interface 42 are orthogonal to each other. Alternatively, the device interface 49 and the article interface 42 could be opposite each other on the refilling device 40. For example, the article interface 42 could be on a side of the refilling device 40 corresponding to the negative z-direction in FIG. 9B, whilst the device interface 49 is located on a side of the refilling device 40 corresponding to the positive z-axis in FIG. 9B.

As illustrated in FIG. 9B, the device interface 49 is located on the same different side of the refilling device 40 to the reservoir interface 46. Alternatively, the device interface 49 and the reservoir interface 46 could be opposite each other on the refilling device 40, such that each of the article interface 42, the reservoir interface 46 and the device interface 49 are located on different sides of the refilling device 40.

The device interface 49 is configured to slide between the first location 49a and the second location 49b. For example, the device interface 49 and a portion of the refilling device may comprise rails and corresponding grooves to allow the device interface 49 to side in a planar fashion (e.g. along the z-axis as illustrated in FIGS. 9A and 9B).

A motor may be connected to the device interface 49, with the refilling control circuitry 48 configured to operate the motor to move the device interface 49 between the first location 49a and the second location 49b. Alternatively, the device interface 49 may comprise a biasing means, such as a spring, configured to bias the device interface 49 towards the second location 49b. A force then needs to be applied on the device interface 49 to overcome the biasing means and move the device interface 49 to the first location 49a. In this case, there may be a latch, clip or other retaining mechanism to hold the device interface 49 in the first location 49a.

The device interface 49 may be configured to slide from the first location 49a to the second location 49b in response to an input on the refilling device 40 by a user of the refilling device 40. For example, where the device interface 49 comprises a motor, the refilling device 40 may comprise input means such as a button, touch screen or switch. In response to the user providing an input on the input means, the refilling control circuitry 48 can be configured to operate the motor to move the device interface 49 from the first location 49a to the second location 49b. The refilling control circuitry 48 can be configured to operate the motor to move the device interface 49 from the second location 49a to the first location 49b in response to a further input from the user, either on the input means via a different input means.

Where the device interface 49 may comprise a biasing means, in response to the user providing an input on the input means, the refilling control circuitry 48 can be configured to release the retaining mechanism, thereby allowing the biasing means to more the device interface 49 from the first location 49a to the second location 49b. Alternatively, the input means can be mechanically connected to the retaining mechanism, such that the user input directly released the retaining mechanism. The user can then push the device interface 49, for example on the outer surface 491, to overcome the biasing means and return the device interface 49 from the second location to the first location, where the retaining mechanism retains the device interface 49 in the first location 49a.

In each case, the input means may be located on the housing 400 of the refilling device 40 proximate to the device interface 49, or on a different location on the refilling device 40. Alternatively, the input means may be located on the device interface, such as on the outer surface 491 of the device interface 49.

As illustrated in FIG. 9B, the device interface 49 is configured to receive the aerosol provision device 20 at the second location 49b. The device interface 49 illustrated in FIG. 9B comprises a recess 492 configured to receive aerosol provision device 20. The recess 492 is a size and shape that corresponds to the size, depth and shape of a portion of the aerosol provision device 20 such that a portion of the aerosol provision device 20 can be inserted into the recess 492 in order for the aerosol provision device 20 to be received by the device interface 49. The recess then secures and retains the aerosol provision device 20 in place.

The device interface 49 illustrated in FIG. 9B also comprises one or more connectors 493, such as contact electrodes, connected via electrical wiring to the refilling control circuitry 48. The connectors 493 are arranged relative to the recess 492 and the device interface 49 in a pattern and position matching/mirroring connectors on the portion of the aerosol provision device in order to facilitate the mating of the connectors 26 on the aerosol provision device 20 and the connectors 493 on the device interface 49 when the aerosol provision device 20 is received by the device interface 49. For example, the connector 493 on the device interface 49 may correspond to a USB-C, mini or micro USB male connector, with the connector 26 on the aerosol provision device 20 corresponding to the equivalent USB-C, mini or micro USB female connector. As illustrated in FIG. 8B, the connector on the aerosol provision device 20 is located on an end of the aerosol provision device 20 opposite the end of the aerosol provision device where the interface 24 is located. Alternatively, the connector on the aerosol provision device 20 that mates with the connector 493 on the device interface 49 may be located on any surface of the aerosol provision device 20 other than the end or surface where the interface 24 with the article 30 is located.

As illustrated in FIG. 9B, the device interface 49 is configured to receive the aerosol provision device 20 in a vertical orientation when the refilling device 40 is located on a horizontal surface. As described above, the refilling device 40 has a flat surface 410 to facilitate storage of the desktop refilling device on another flat surface. As illustrated in FIG. 9B, the flat surface 410 can be aligned such that the flat surface is substantially horizontal (in the x-z plane in FIG. 9B). The device interface 49 is then configured to receive the aerosol provision device in a vertical direction (in other words, a direction perpendicular to the flat surface 410). In FIG. 9B, the recess 492 of the device interface 49 is located in the same x-z plane as the flat surface 410, but on the opposite side of the refilling device 40; in other words, the flat surface 410 is on the negative y side of the refilling device 40 whilst the recess 492 of the device interface 49 is located on the positive y side of the refilling device. This allows the aerosol provision device 20 to be received by the device interface 49 from above by lowering the aerosol provision device 20 downwards onto the device interface 49, into the recess 492 (in other words, in the negative y direction).

By comparing FIGS. 5A and 5B with FIGS. 9A and 9B, it will also be appreciated that the device interface 49 in FIG. 8B is configured to receive the aerosol provision device 20 in an orientation or direction perpendicular to an orientation or direction in which the article interface 42 is configured to receive the article 30. As described above in reference to FIGS. 5A and 5B, the article interface 42 is configured to receive the article 30 in a horizontal orientation when the refilling device 40 is located on a horizontal surface; this direction corresponds to the x-axis in FIGS. 5A, 5B, 9A and 9B. In contrast, the device interface 49 is configured to receive the aerosol provision device 20 in a vertical orientation when the refilling device 40 is located on a horizontal surface; this direction corresponds to the y-axis in FIGS. 5A, 5B, 9A and 9B. Accordingly, the device interface 49 illustrated in FIGS. 9A and 9B is configured to receive the aerosol provision device 20 in an orientation or direction perpendicular to an orientation or direction in which the article interface 42 is configured to receive the article 30.

As described above, the refilling control circuitry 48 of the refilling device is configured to facilitate the transfer of aerosol-generating material 52 from a reservoir 50 to an article 30. For example, the refilling control circuitry 48 can facilitate the transfer of aerosol-generating material 52 from a reservoir 50 to an article 30 in response to detecting that the article 30 has been received by the refilling device 40. As described above, the refilling control circuitry 48 can be configured to detect that the article 30 has been received by the article interface 42, such as by detecting the connectors 31 on the article 30 mating with the connectors 41 on the refilling device when the article 30 is received by the article interface 42. As described above, the refilling control circuitry 48 may additionally detect that an article 30 has been received by a holder 420 of the article interface 42, and that the holder is in a closed configuration before facilitating the transfer of aerosol-generating material 52 from a reservoir 50 to an article 30.

The refilling control circuitry 48 is further configured to determine an amount of aerosol generating material in the article 30 in response to detecting that the article 30 has been received by the refilling device 40. As described above, the refilling control circuitry 48 can be configured to communicate with article control circuitry 38 in the article 30. The refilling control circuitry 48 can therefore determine an amount of aerosol generating material in the article 30 by communicating with the article control circuitry 38 and receiving an indication of the amount of aerosol generating material in the article 30 from the article control circuitry 38. Alternatively, the refilling device 40 may comprise a sensor, such as a light, capacitive or ultrasonic sensor configured to detect the amount of aerosol generating material in the article 30. The refilling control circuitry 48 can control the sensor to detect the amount of aerosol generating material in the article 30 in response to detecting that the article 30 has been received by the refilling device and then determine the amount of aerosol generating material in the article 30 based on data received from the sensor.

The refilling control circuitry 48 is then configured to facilitate the transfer of aerosol generating material 52 from the reservoir 50 to the article 30 in response to determining that the amount of aerosol generating material in the article 30 is less that an article threshold. As will be appreciate, the article 30 need only be refilled with aerosol generating material when there is little or no aerosol generating material remaining in the article 30. The article threshold is therefore set to ensure that the transfer of aerosol generating material 52 from the reservoir 50 to the article is not attempted when there is already a sufficient amount of aerosol generating material in the article 30. For example, the article threshold may correspond to half of the capacity or volume of the aerosol-generating material storage area 39 of the article 30, or correspond to less than half capacity of the aerosol-generating material storage area 39, such as a quarter or a sixth. If the amount of aerosol generating material in the article is greater than the article reservoir threshold, then it is not possible to facilitate the transfer of aerosol generating material 52, and the refilling control circuitry 48 may be configured to provide a notification to the user.

The amount of aerosol generating material 52 transferred from the reservoir 50 to the article 30 can be based on the amount of aerosol generating material in the article 30. For example, the refilling control circuitry 48 can be configured to determine the amount of capacity or volume of the aerosol-generating material storage area 39 of the article, for example by communicating with the article control circuitry 38. The refilling control circuitry 48 is then configured to facilitate the transfer of an amount of aerosol generating material 52 from the reservoir 50 to the article 30 such that the aerosol-generating material storage area 39 of the article 30 is full or at capacity with aerosol generating material. In other words, the amount of aerosol generating material 52 transferred from the reservoir 50 to the article 30 corresponds to the difference between the capacity or volume of the aerosol-generating material storage area 39 of the article 30 and the amount of aerosol generating material in the article 30.

The refilling control circuitry 48 can also be configured facilitate the transfer of aerosol-generating material 52 from the reservoir 50 to the article 30 in response to detecting that the reservoir 50 has been received by the refilling device 40. As described above, the refilling control circuitry 48 can be configured to detect that the reservoir 50 has been received by the reservoir interface 46, such as by detecting the connectors 51 on the reservoir 51 mating with the connectors 47 on the refilling device 40 when the reservoir 50 is received by the reservoir interface 46. As described above, the refilling control circuitry 48 may additionally detect that a reservoir has been received by a holder 460 of the reservoir interface 46, and that an access panel 463 is in a closed configuration before facilitating the transfer of aerosol-generating material 52 from a reservoir 50 to an article 30.

The refilling control circuitry 48 is further configured to determine an amount of aerosol generating material 52 in the reservoir 50 in response to detecting that the reservoir 50 has been received by the refilling device 40. As described above, the refilling control circuitry 48 can be configured to communicate with reservoir control circuitry 58 in the reservoir 50. The refilling control circuitry 48 can therefore determine an amount of aerosol generating material in the reservoir 50 by communicating with the reservoir control circuitry 58 and receiving an indication of the amount of aerosol generating material in the reservoir 50 from the reservoir control circuitry 58. Alternatively, the refilling device 40 may comprise a sensor, such as a light, capacitive or ultrasonic sensor configured to detect the amount of aerosol generating material 52 in the reservoir 50. The refilling control circuitry 48 can control the sensor to detect the amount of aerosol generating material in the reservoir 50 in response to detecting that the reservoir 50 has been received by the refilling device 40, and then determine the amount of aerosol generating material in the reservoir 50 based on data received from the sensor.

The refilling control circuitry 48 can then be configured to facilitate the transfer of aerosol generating material 52 from the reservoir 50 to the article 30 in response to determining that the amount of aerosol generating material 52 in the reservoir 50 is greater than a reservoir threshold. The reservoir threshold represent a minimum amount of aerosol generating material 52 that can be transferred from the reservoir 50 to the article 30. If the amount of aerosol generating material 52 in the reservoir 50 is less than a reservoir threshold, then it is not possible to facilitate the transfer of aerosol generating material 52, and the refilling control circuitry 48 may be configured to provide a notification to the user.

The amount of aerosol generating material 52 transferred from the reservoir 50 to the article 30 can be based on the amount of aerosol generating material 52 in the reservoir 50. For example, if the amount of aerosol generating material 52 in the reservoir 50 is less than an available capacity of the aerosol-generating material storage area 39 of the article 30 (in other words, if the amount of aerosol generating material 52 in the reservoir 50 is less than the difference between the capacity of the aerosol-generating material storage area 39 and the amount of aerosol generating material in the article 30) the refilling control circuitry 48 can be configured to facilitate the transfer of all of the aerosol generating material 52 from the reservoir to the article 30. Alternatively, if the amount of aerosol generating material 52 in the reservoir is less than an available capacity of the aerosol-generating material storage area 39 of the article 30 (in other words, if the amount of aerosol generating material 52 in the reservoir 50 is less than the difference between the capacity of the aerosol-generating material storage area 39 and the amount of aerosol generating material in the article 30), then the refilling control circuitry 48 can be configured to facilitate the transfer of an amount of aerosol generating material 52 from the reservoir 50 to the article 30 corresponding to the available capacity of the aerosol-generating material storage area 39 of the article 30. In other words, the refilling control circuitry 48 is configured to facilitate the transfer of aerosol generating material 52 from the reservoir 50 to the article 30 such that the aerosol-generating material storage area 39 of the article 30 is full of aerosol generating material.

As described above, the refilling control circuitry 48 can also be configured to transfer electrical power to the aerosol provision device 20 for charging a power source 14 of the aerosol provision device 20 in response to detecting that the aerosol provision device 20 has been received by the refilling device 40. The refilling control circuitry 48 may detect that the aerosol provision device 20 has been received by the refilling device 40 by detecting the connectors 26 on the aerosol provision device 20 mating with the connectors 493 on the refilling device 40 when the aerosol provision device 20 is received by the device interface 49.

A described above, a method of refilling an article 30 of an aerosol provision system 10, performed by a refilling device 40, such as by the refilling control circuitry 48, comprises facilitating the transfer of aerosol-generating material from a reservoir to the article in response to detecting that the article has been received by the refilling device. The method may further comprise any of the steps and operations performed by the refilling device 40, and in particular the refilling control circuitry 48 as described herein. The methods may be stored as instructions on a computer readable storage medium, such that when the instructions are executed by a processor, the methods described herein are performed. The computer readable storage medium may be non-transitory.

As described above, the present disclosure relates to (but it not limited to) a refilling device for an article of an aerosol provision system comprising refilling control circuitry configured to facilitate the transfer of aerosol-generating material from a reservoir to the article in response to detecting that the article has been received by the refilling device.

Thus, there has been described refilling devices, refilling apparatuses and methods of refilling articles of aerosol provision systems.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A refilling apparatus for an article of an aerosol provision system comprising:
    an article interface configured to receive the article;
    a reservoir interface configured to receive a reservoir with a volume greater than a volume of the article; and
    refilling control circuitry configured to facilitate the transfer of aerosol-generating material from the reservoir to the article, wherein the article interface comprises a holder configured to move between an open configuration and a closed configuration, wherein the holder is at least partially located outside a housing of the refilling apparatus in the open configuration and the holder is located within the housing in the closed configuration; and
    a motor connected to the holder, wherein the refilling control circuitry is further configured to operate the motor to move the holder between the open configuration and the closed configuration; and
    wherein the refilling control circuitry is further configured to operate the motor to:
        slide the holder to the closed configuration in response to the article being received by the holder; and/or
        slide the holder to the open configuration in response to the transfer of aerosol- generating material from the reservoir to the article.

2. The refilling apparatus of claim 1, wherein the holder is configured to slide into and out of an article opening in the housing, and an outer surface of the holder is configured to close the article opening and lie flush with housing when the holder is in the closed configuration.

3. The refilling apparatus of claim 1, wherein the refilling control circuitry is configured to facilitate the transfer of aerosol-generating material from the reservoir to the article when the holder is in the closed configuration.

4. The refilling apparatus of claim 1, wherein the holder is configured to receive the article when the holder is in the open configuration.

5. The refilling apparatus of claim 4, wherein the holder is a tray configured to receive the article from above such that the article rests on the tray when the refilling apparatus is located on a horizontal surface.

6. The refilling apparatus of claim 5, wherein the tray comprises a trough with a size and shape conforming to a perimeter size and shape of the article.

7. The refilling apparatus of claim 1, wherein the holder is configured to receive the article in a horizontal orientation when the refilling apparatus is located on a horizontal surface; and/or wherein the holder is configured to move in a horizontal direction when the refilling apparatus is located on a horizontal surface.

8. The refilling apparatus of claim 1, further comprising an indicator light on the refilling device wherein the refilling control circuitry is further configured to operate the indicator light based on the transfer of aerosol-generating material from the reservoir to the article.

9. The refilling apparatus of claim 8, wherein the indicator light is located on the article interface.

10. The refilling apparatus of claim 8, wherein the holder is configured to slide into and out of an article opening in the housing of the refilling apparatus, and the indicator light surrounds the article opening on the housing.

11. The refilling apparatus of claim 1, wherein the reservoir interface comprises a reservoir interface holder with a retaining mechanism configured to receive and retain the reservoir.

12. The refilling apparatus of claim 11, wherein the retaining mechanism is a spring clip.

13. The refilling apparatus of claim 1, wherein the reservoir interface is located within a reservoir opening in the housing of the refilling apparatus.

14. The refilling apparatus of claim 13, wherein the housing comprises an access panel configured to move between an open configuration and a closed configuration, wherein the reservoir interface is configured to receive the reservoir when the access panel is in the open configuration, and the reservoir opening is sealed by the access panel when the access panel is in the closed configuration.

15. The refilling apparatus of claim 14, wherein the access panel is a sliding panel; or wherein the access panel is a sliding panel which extends around part or all of the perimeter of the housing.

16. The refilling apparatus of claim 14, wherein the holder slides in a direction perpendicular to a direction the access panel moves between the open configuration and the closed configuration.

17. The refilling apparatus of claim 1, wherein the refilling apparatus is a desktop refilling device.

18. The refilling apparatus of claim 17, wherein desktop refilling device comprises a mains power supply.

19. The refilling apparatus of claim 17, wherein the desktop refilling device comprises a flat surface to facilitate storage of the desktop refilling device on another flat surface.

* * * * *